United States Patent
He et al.

(10) Patent No.: US 11,963,234 B2
(45) Date of Patent: Apr. 16, 2024

(54) UNIFIED APPROACH TO RANDOM ACCESS CHANNEL PARTITIONING AND INDICATION

(71) Applicant: QUALCOMM Incorporated, San Diego, CA (US)

(72) Inventors: Linhai He, San Diego, CA (US); Masato Kitazoe, Tokyo (JP); Ruiming Zheng, Beijing (CN); Peng Cheng, Beijing (CN); Jianhua Liu, Beijing (CN); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/823,908

(22) Filed: Aug. 31, 2022

(65) Prior Publication Data
US 2023/0038191 A1 Feb. 9, 2023

Related U.S. Application Data

(63) Continuation of application No. PCT/CN2021/110485, filed on Aug. 4, 2021.

(51) Int. Cl.
*H04W 4/00* (2018.01)
*H04W 74/00* (2009.01)
*H04W 74/0833* (2024.01)

(52) U.S. Cl.
CPC ..... *H04W 74/0833* (2013.01); *H04W 74/002* (2013.01)

(58) Field of Classification Search
CPC ........... H04W 74/0833; H04W 74/002; H04W 74/006
See application file for complete search history.

(56) References Cited

U.S. PATENT DOCUMENTS

2005/0026622 A1 2/2005 Georgeaux et al.
2013/0301541 A1* 11/2013 Mukherjee ........ H04W 74/0833
370/329

(Continued)

FOREIGN PATENT DOCUMENTS

| CN | 104285491 A | 1/2015 |
| WO | WO-2023012705 A1 * | 2/2023 |
| WO | WO-2023014761 A1 * | 2/2023 |

OTHER PUBLICATIONS

U.S. Appl. No. 63/228,903, filed 2021.*

(Continued)

*Primary Examiner* — Thai D Hoang
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, information that configures multiple random access channel (RACH) partitions, wherein the multiple RACH partitions are each associated with a respective combination of one or more RACH features. The UE may select, from the multiple RACH partitions, a RACH partition based at least in part on the UE satisfying one or more criteria for the combination of one or more RACH features associated with the RACH partition. The UE may transmit, to the base station, a preamble on physical RACH (PRACH) resources associated with the RACH partition to initiate a RACH procedure supporting the combination of one or more RACH features associated with the RACH partition. Numerous other aspects are described.

18 Claims, 11 Drawing Sheets

(56) References Cited

U.S. PATENT DOCUMENTS

2022/0287103 A1* 9/2022 Cozzo ................ H04W 74/008
2023/0108510 A1* 4/2023 Wang ................ H04W 74/0841
                                                        370/329

OTHER PUBLICATIONS

International Search Report and Written Opinion—PCT/CN2021/110485—ISA/EPO—dated Apr. 7, 2022.
RAN WG2: "Proposed LS on Status of the Work on RACH Model TSG-RAN Working Group 1", TSGR1#7(99)c44, Sophia Antipolis, France, Aug. 16 to 20, 1999, Sep. 3, 1999 (Sep. 3, 1999), 1 Page.
Co-pending International Patent Application No. PCT/CN2021/110485, filed Aug. 4, 2021, 69 pages.

* cited by examiner

UNIFIED APPROACH TO RANDOM ACCESS CHANNEL PARTITIONING AND INDICATION

CROSS-REFERENCE TO RELATED APPLICATIONS

This application is a continuation of International Application No. PCT/CN2021/110485, filed Aug. 4, 2021, entitled "UNIFIED APPROACH TO RANDOM ACCESS CHANNEL PARTITIONING AND INDICATION," and assigned to the assignee hereof. The disclosure of International Application No. PCT/CN2021/110485 is considered part of this application and is incorporated by reference herein in its entirety for all purposes.

FIELD OF THE DISCLOSURE

Aspects of the present disclosure generally relate to wireless communication and to techniques and apparatuses associated with a unified approach to random access channel (RACH) partitioning and indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, information that configures multiple random access channel (RACH) partitions, wherein the multiple RACH partitions are each associated with a respective combination of one or more RACH features. The method may include selecting, from the multiple RACH partitions, a RACH partition based at least in part on the UE satisfying one or more criteria for the combination of one or more RACH features associated with the RACH partition. The method may include transmitting, to the base station, a preamble on physical RACH (PRACH) resources associated with the RACH partition to initiate a RACH procedure supporting the combination of one or more RACH features associated with the RACH partition.

Some aspects described herein relate to a method of wireless communication performed by a base station. The method may include transmitting information that configures multiple RACH partitions, wherein the multiple RACH partitions are each associated with a respective combination of one or more RACH features. The method may include receiving a preamble on PRACH resources associated with a RACH partition, from the multiple RACH partitions, wherein the preamble is received from a UE that satisfies one or more criteria for the combination of one or more RACH features associated with the RACH partition.

Some aspects described herein relate to a UE for wireless communication. The user equipment may include a memory and one or more processors coupled to the memory. The one or more processors may be configured to receive, from a base station, information that configures multiple RACH partitions, wherein the multiple RACH partitions are each associated with a respective combination of one or more RACH features. The one or more processors may be configured to select, from the multiple RACH partitions, a RACH partition based at least in part on the UE satisfying one or more criteria for the combination of one or more RACH features associated with the RACH partition. The one or more processors may be configured to transmit, to the base station, a preamble on PRACH resources associated with the RACH partition to initiate a RACH procedure supporting the combination of one or more RACH features associated with the RACH partition.

Some aspects described herein relate to a base station for wireless communication. The base station may include a memory and one or more processors coupled to the memory. The one or more processors may be configured to transmit information that configures multiple RACH partitions, wherein the multiple RACH partitions are each associated with a respective combination of one or more RACH features. The one or more processors may be configured to receive a preamble on PRACH resources associated with a RACH partition, from the multiple RACH partitions, wherein the preamble is received from a UE that satisfies one or more criteria for the combination of one or more RACH features associated with the RACH partition.

Some aspects described herein relate to a non-transitory computer-readable medium that stores a set of instructions for wireless communication by a UE. The set of instructions, when executed by one or more processors of the UE, may cause the UE to receive, from a base station, information that configures multiple RACH partitions, wherein the multiple RACH partitions are each associated with a respective combination of one or more RACH features. The set of instructions, when executed by one or more processors of the UE, may cause the UE to select, from the multiple RACH partitions, a RACH partition based at least in part on the UE satisfying one or more criteria for the combination of one or more RACH features associated with the RACH partition. The set of instructions, when executed by one or more processors of the UE, may cause the UE to transmit, to the base station, a preamble on PRACH resources associated with the RACH partition to initiate a RACH procedure supporting the combination of one or more RACH features associated with the RACH partition.

Some aspects described herein relate to a non-transitory computer-readable medium that stores a set of instructions for wireless communication by a base station. The set of instructions, when executed by one or more processors of the base station, may cause the base station to transmit information that configures multiple RACH partitions, wherein the multiple RACH partitions are each associated with a respective combination of one or more RACH features. The set of instructions, when executed by one or more processors of the base station, may cause the base station to receive a preamble on PRACH resources associated with a RACH partition, from the multiple RACH partitions, wherein the preamble is received from a UE that satisfies one or more criteria for the combination of one or more RACH features associated with the RACH partition.

Some aspects described herein relate to an apparatus for wireless communication. The apparatus may include means for receiving, from a base station, information that configures multiple RACH partitions, wherein the multiple RACH partitions are each associated with a respective combination of one or more RACH features. The apparatus may include means for selecting, from the multiple RACH partitions, a RACH partition based at least in part on the apparatus satisfying one or more criteria for the combination of one or more RACH features associated with the RACH partition. The apparatus may include means for transmitting, to the base station, a preamble on PRACH resources associated with the RACH partition to initiate a RACH procedure supporting the combination of one or more RACH features associated with the RACH partition.

Some aspects described herein relate to an apparatus for wireless communication. The apparatus may include means for transmitting information that configures multiple RACH partitions, wherein the multiple RACH partitions are each associated with a respective combination of one or more RACH features. The apparatus may include means for receiving a preamble on PRACH resources associated with a RACH partition, from the multiple RACH partitions, wherein the preamble is received from a UE that satisfies one or more criteria for the combination of one or more RACH features associated with the RACH partition.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
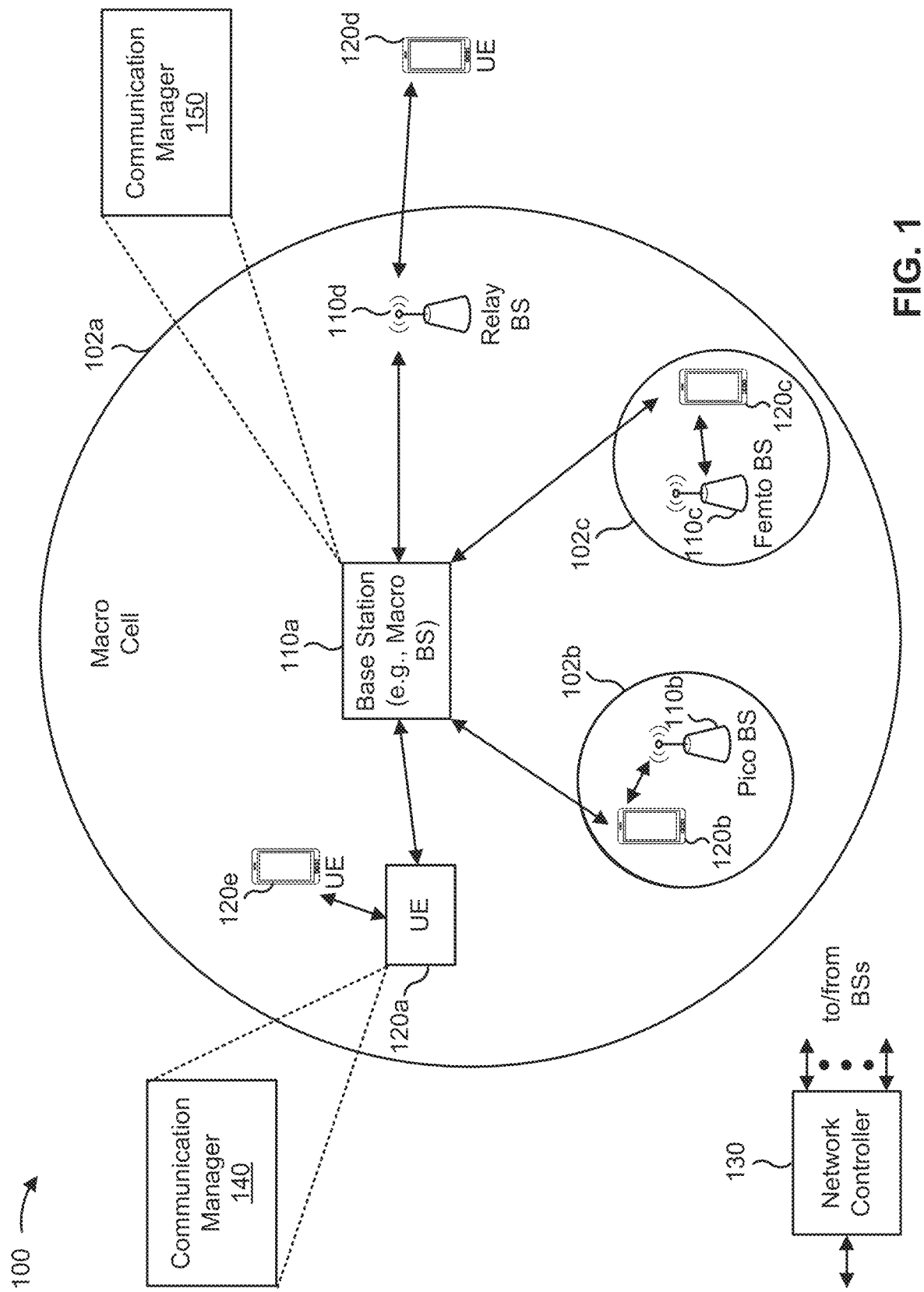
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, information that configures multiple random access channel (RACH) partitions, wherein the multiple RACH partitions are each associated with a respective combination of one or more RACH features; select, from the multiple RACH partitions, a RACH partition based at least in part on the UE satisfying one or more criteria for the combination of one or more RACH features associated with the RACH partition; and transmit, to the base station, a preamble on physical RACH (PRACH) resources associated with the RACH partition to initiate a RACH procedure supporting the combination of one or more RACH features associated with the RACH partition. Additionally, or alternatively, the communication manager 140 may perform one or more other operations described herein.

In some aspects, the base station 110 may include a communication manager 150. As described in more detail elsewhere herein, the communication manager 150 may transmit information that configures multiple RACH partitions, wherein the multiple RACH partitions are each associated with a respective combination of one or more RACH features; and receive a preamble on PRACH resources associated with a RACH partition, from the multiple RACH partitions, wherein the preamble is received from a UE that satisfies one or more criteria for the combination of one or more RACH features associated with the RACH partition. Additionally, or alternatively, the communication manager 150 may perform one or more other operations described herein.

As indicated above, FIG. 1 is provided as an example. Other examples may differ from what is described with regard to FIG. 1.

Figure 2:
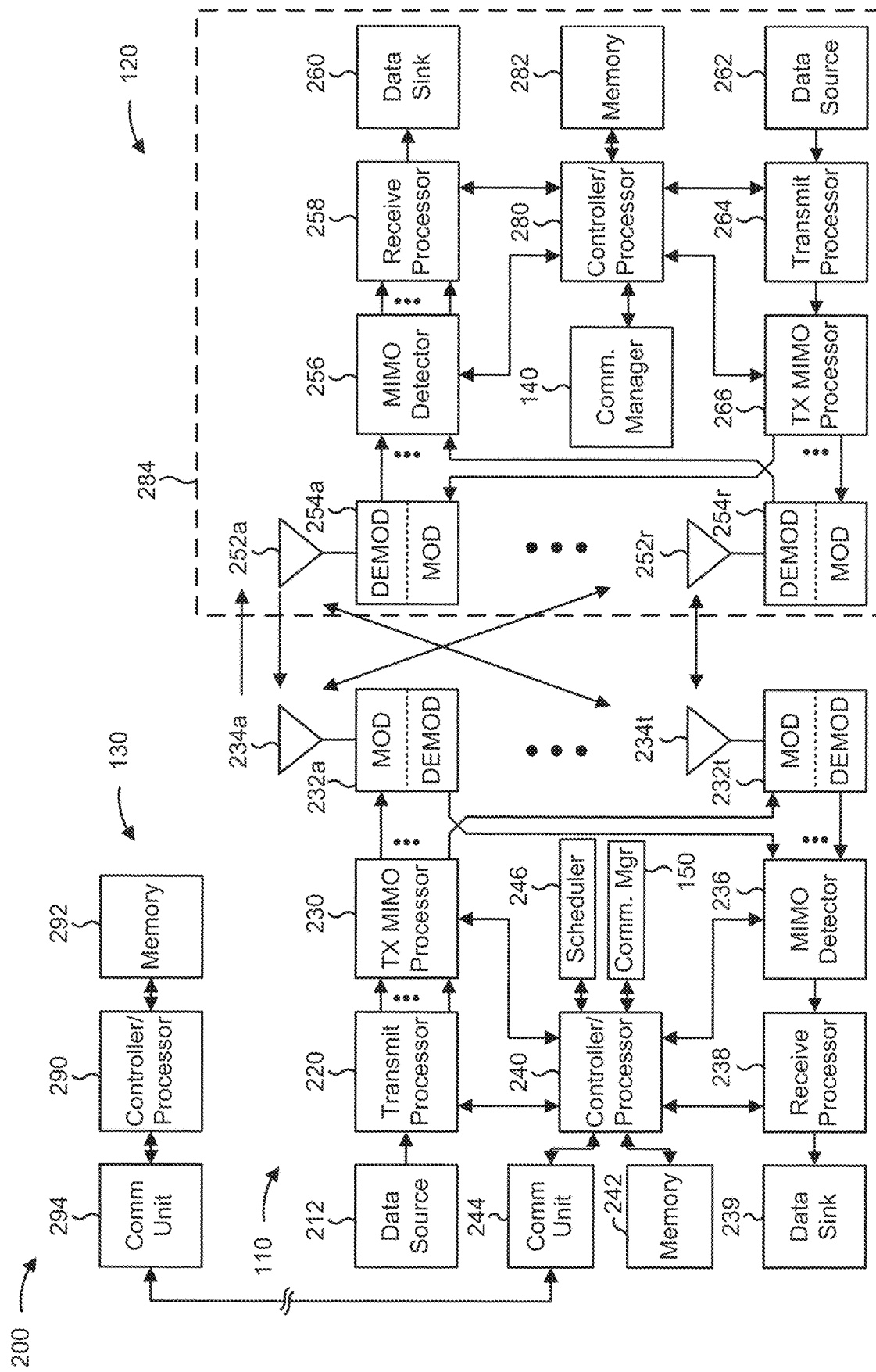
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-5C and/or FIGS. 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-5C and/or FIGS. 6-9).

The controller/processor 240 of the base station 110, the controller/processor 280 of the UE 120, and/or any other component(s) of FIG. 2 may perform one or more techniques associated with a unified approach to RACH partitioning and indication, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving, from the base station 110, information that configures multiple RACH partitions, wherein the multiple RACH partitions are each associated with a respective combination of one or more RACH features; means for selecting, from the multiple RACH partitions, a RACH partition based at least in part on the UE 120 satisfying one or more criteria for the combination of one or more RACH features associated with the RACH partition; and/or means for transmitting, to the base station 110, a preamble on PRACH resources associated with the RACH partition to initiate a RACH procedure supporting the combination of one or more RACH features associated with the RACH partition. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting information that configures multiple RACH partitions, wherein the multiple RACH partitions are each associated with a respective combination of one or more RACH features; and/or means for receiving a preamble on PRACH resources associated with a RACH partition, from the multiple RACH partitions, wherein the preamble is received from a UE 120 that satisfies one or more criteria for the combination of one or more RACH features associated with the RACH partition. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
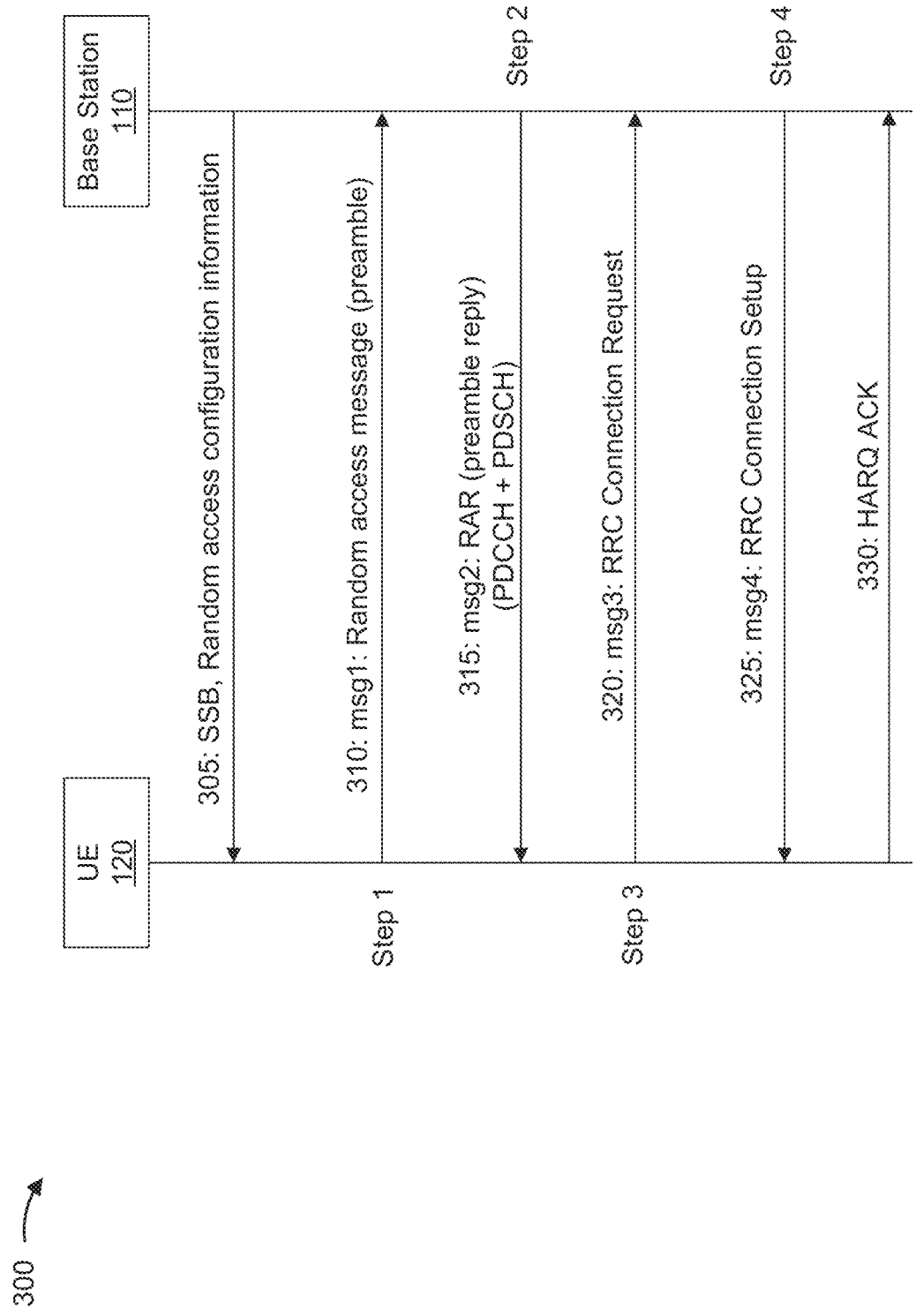
FIG. 3 is a diagram illustrating an example of a four-step random access channel (RACH) procedure, in accordance with the present disclosure.

FIG. 3 is a diagram illustrating an example of a four-step RACH procedure, in accordance with the present disclosure. As shown in FIG. 3, a base station 110 and a UE 120 may communicate with one another to perform the four-step RACH procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM) and/or one or more parameters for receiving a random access response (RAR).

As shown by reference number 310, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step RACH procedure. The RAM may include a random access preamble identifier.

As shown by reference number 315, the base station 110 may transmit an RAR as a reply to the preamble. The message that includes the RAR may be referred to as message 2, msg2, MSG2, or a second message in a four-step RACH procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step RACH procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also, as part of the second step of the four-step RACH procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 320, the UE 120 may transmit an RRC connection request message. The RRC connection request message may be referred to as message 3, msg3, MSG3, or a third message of a four-step RACH procedure. In some aspects, the RRC connection request may include a UE identifier, uplink control information (UCI), and/or a physical uplink shared channel (PUSCH) communication (e.g., an RRC connection request).

As shown by reference number 325, the base station 110 may transmit an RRC connection setup message. The RRC connection setup message may be referred to as message 4, msg4, MSG4, or a fourth message of a four-step RACH procedure. In some aspects, the RRC connection setup message may include the detected UE identifier, a timing advance value, and/or contention resolution information. As shown by reference number 330, if the UE 120 successfully receives the RRC connection setup message, the UE 120 may transmit a hybrid automatic repeat request (HARD) acknowledgement (ACK).

As indicated above, FIG. 3 is provided as an example. Other examples may differ from what is described with regard to FIG. 3.

Figure 4:
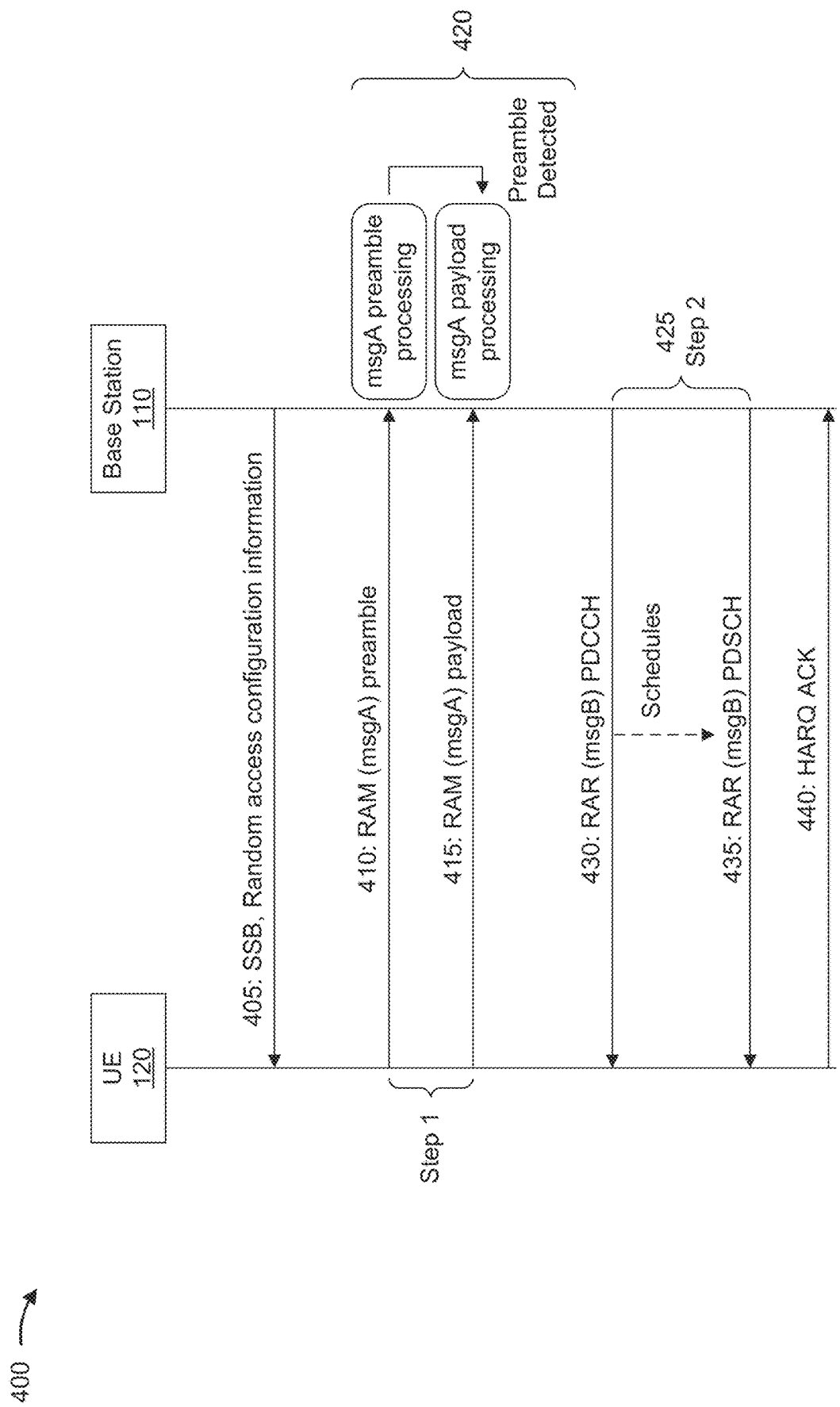
FIG. 4 is a diagram illustrating an example of a two-step RACH procedure, in accordance with the present disclosure.

FIG. 4 is a diagram illustrating an example 400 of a two-step RACH procedure, in accordance with the present disclosure. As shown in FIG. 4, a base station 110 and a UE 120 may communicate with one another to perform the two-step RACH procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the two-step RACH procedure, such as one or more parameters for transmitting a RAM and/or receiving an RAR.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step RACH procedure. In some aspects, the RAM may be referred to as message A, msgA, a first message, or an initial message in a two-step RACH procedure. Furthermore, in some aspects, the RAM preamble may be referred to as a message A preamble, a msgA preamble, a preamble, or a PRACH preamble, and the RAM payload may be referred to as a message A payload, a msgA payload, or a payload. In some aspects, the RAM may include some or all of the contents of msg1 and msg3 of a four-step RACH procedure, which is described in more detail above. For example, the RAM preamble may include some or all contents of msg1 (e.g., a PRACH preamble), and the RAM payload may include some or all contents of msg3 (e.g., a UE identifier, UCI, and/or a PUSCH transmission).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step RACH procedure. In some aspects, the RAR message may be referred to as message B, msgB, or a second message in a two-step RACH procedure. In cases where the base station 110 is able to successfully receive and decode both the RAM preamble and the RAM payload, the RAR message (msgB) may include some or all of the contents of msg2 and msg4 of a four-step RACH procedure. For example, the RAR message may include the detected PRACH preamble identifier, the detected UE identifier, a timing advance value, and/or contention resolution information. Alternatively, in cases where the base station 110 is able to successfully receive and decode only the RAM preamble, the msgB may include some or all of the contents of only msg2 of a four-step RACH procedure, and the UE 120 may then switch the four-step RACH procedure.

As shown by reference number 430, as part of the second step of the two-step RACH procedure, the base station 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 435, as part of the second step of the two-step RACH procedure, the base station 110 may transmit the PDSCH communication for the RAR, as scheduled by the PDCCH communication. The RAR may be included in a MAC PDU of the PDSCH communication. As shown by reference number 440, if the UE 120 successfully receives the RAR, the UE 120 may transmit a HARQ ACK.

As indicated above, FIG. 4 is provided as an example. Other examples may differ from what is described with regard to FIG. 4.

In a wireless network, a base station may provide different random access configurations to support RACH features associated with different use cases. For example, a base station may generally configure a four-step RACH procedure (e.g., as described with reference to FIG. 3) as a default or legacy RACH feature, and the base station may further configure a two-step RACH procedure (e.g., as described with reference to FIG. 4) to reduce latency and control signaling overhead by having a single round-trip cycle between the UE and the base station (as opposed to two round-trip cycles in the case of a four-step RACH procedure). Additionally, or alternatively, the base station may provide one or more random access configurations to support RACH features such as a small data transfer (SDT) to transfer small data payloads to and/or from the UE during the RACH procedure, radio access network (RAN) slices or slice groups (e.g., a network architecture model in which logically distinct network slices using common network infrastructure operate as isolated end-to-end networks customized to satisfy different service requirements), enhanced coverage in wireless environments with poor network conditions (e.g., using multiple msg3 repetitions), reduced capability (RedCap) UEs to improve access by UEs that may have a reduced feature set relative to a premium UE, and/or preamble groupings to indicate different preamble sequences to be selected depending on the size of uplink data to be sent by a UE and/or network conditions associated with the UE, among other examples.

In existing wireless networks, each RACH feature supported by a base station can be configured with separate PRACH resources (e.g., RACH occasions (ROs) and/or preambles) that are dedicated to the respective RACH feature. For example, the base station may configure a first set of PRACH resources (e.g., a first set of ROs and/or a first set preambles) for a coverage enhancement RACH feature and may configure a second set of PRACH resources (e.g., a second set of ROs and/or a second set preambles) for a RedCap RACH feature. In this way, a UE may initiate a RACH procedure using the dedicated PRACH resources in order to request special handling associated with the corresponding RACH feature or use case from the network. However, providing a separate PRACH configuration for each RACH feature generally results in high signaling overhead and inefficient resource utilization. For example, if a base station that supports N different RACH features were to provide a separate dedicated PRACH configuration for each possible combination of RACH features, the base station would have to configure $2^N$ RACH partitions, where one RACH partition may generally correspond to one set of dedicated PRACH resources to support a particular combination of one or more RACH features. Furthermore, separate PRACH configurations may result in a hard partition of PRACH resources, which may be inefficient because PRACH resource configurations are typically advertised or otherwise indicated in system information, which is usually updated infrequently. As a result, the base station may be unable to closely track access loads (e.g., the number of UEs that are initiating a RACH procedure associated with a given set of RACH features) and make frequent updates to PRACH configurations based on the access loads, whereby the hard partition of PRACH resources may result in inefficient resource utilization (sometimes referred to as trunking gain). Furthermore, various elements in the separate RACH configurations may be redundant (e.g., the same across different RACH configurations), which results in high signaling overhead.

Some aspects described herein relate to techniques and apparatuses to provide a unified approach to RACH partitioning and indication for different RACH features or use cases. For example, in some aspects, a base station may configure multiple RACH partitions that are each associated with a particular combination of one or more RACH features, where one or more configured RACH partitions may be associated with a joint configuration between multiple RACH features (e.g., a combination of a RedCap RACH feature and an SDT RACH feature). Furthermore, to avoid having an excess number of RACH partitions that may lead to unnecessary resource fragmentation, the base station may configure RACH partitions for only a subset of all possible combinations of RACH features (e.g., excluding combinations of RACH features that may be incompatible with one another and/or combinations of RACH features that may have a low expected load). In some aspects, a UE may select, from the multiple RACH partitions configured by the base station, a RACH partition associated with one or more criteria that are satisfied by the UE, and the UE may transmit a RAM using PRACH resources associated with the selected RACH partition (e.g., using a preamble and/or an RO associated with the selected RACH partition) to initiate a RACH procedure that supports the combination of features associated with the selected RACH partition. Furthermore, in cases where the UE satisfies the criteria associated with more than one RACH partition, the UE may apply one or more rules to select the appropriate RACH partition. For example, as described herein, the one or more rules may define relative priorities among different RACH features and may ensure backward compatibility with legacy RACH features (e.g., first deciding whether to use a normal uplink (NUL) or a supplemental uplink (SUL) to initiate the RACH procedure when selecting among available RACH partitions configured by the base station). In this way, the base station may more efficiently allocate PRACH resources between different RACH partitions because the base station does not have to reserve PRACH resources to RACH partitions that may not be in use or may have a low load, and the base station 110 may hierarchically configure RACH partitions resulting in more efficient signaling and more efficient resource usage.

Figure 5A:
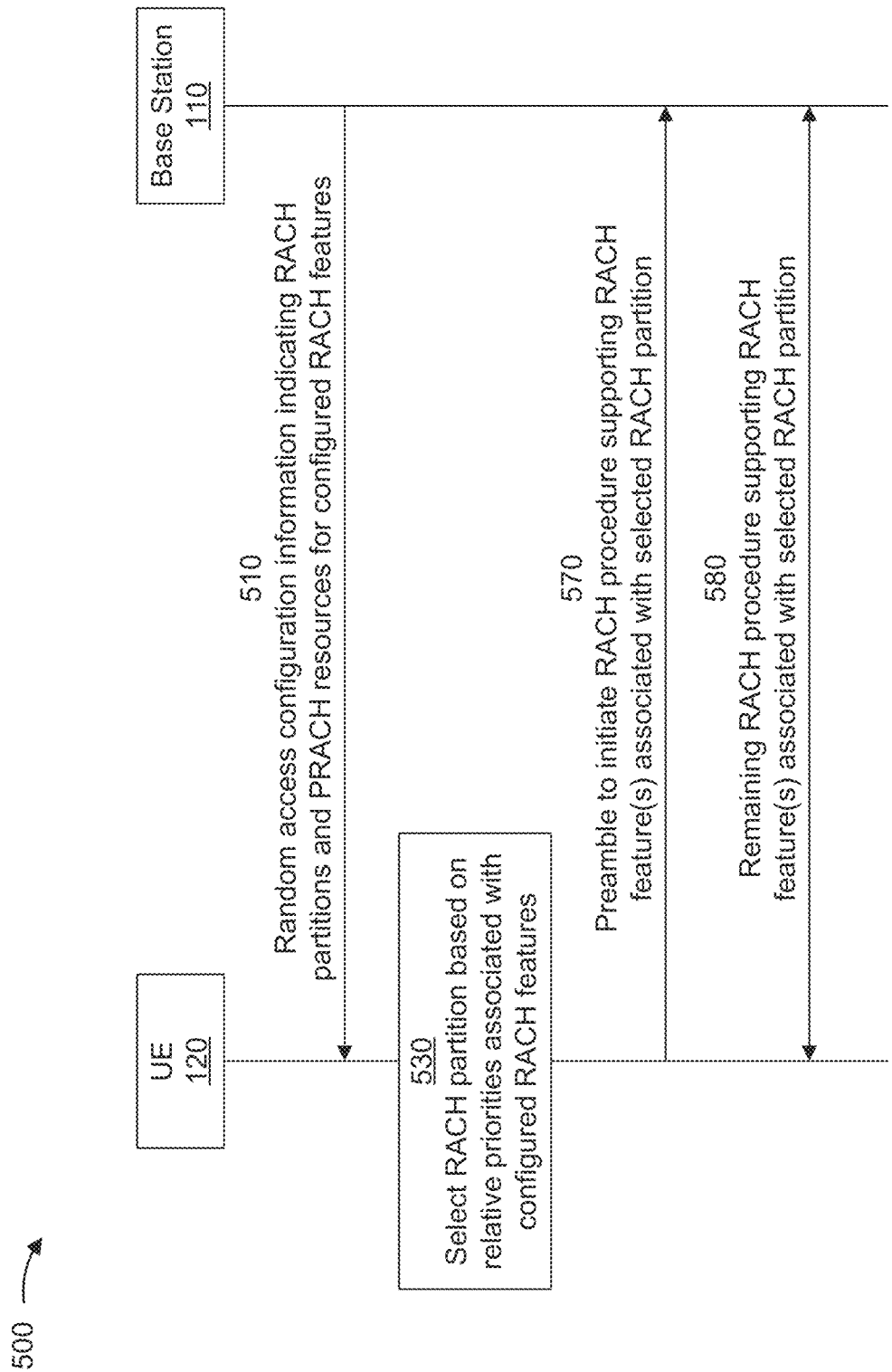
FIGS. 5A-5C are diagrams illustrating examples associated with a unified approach to RACH partitioning and indication, in accordance with the present disclosure.
Figure 5B:
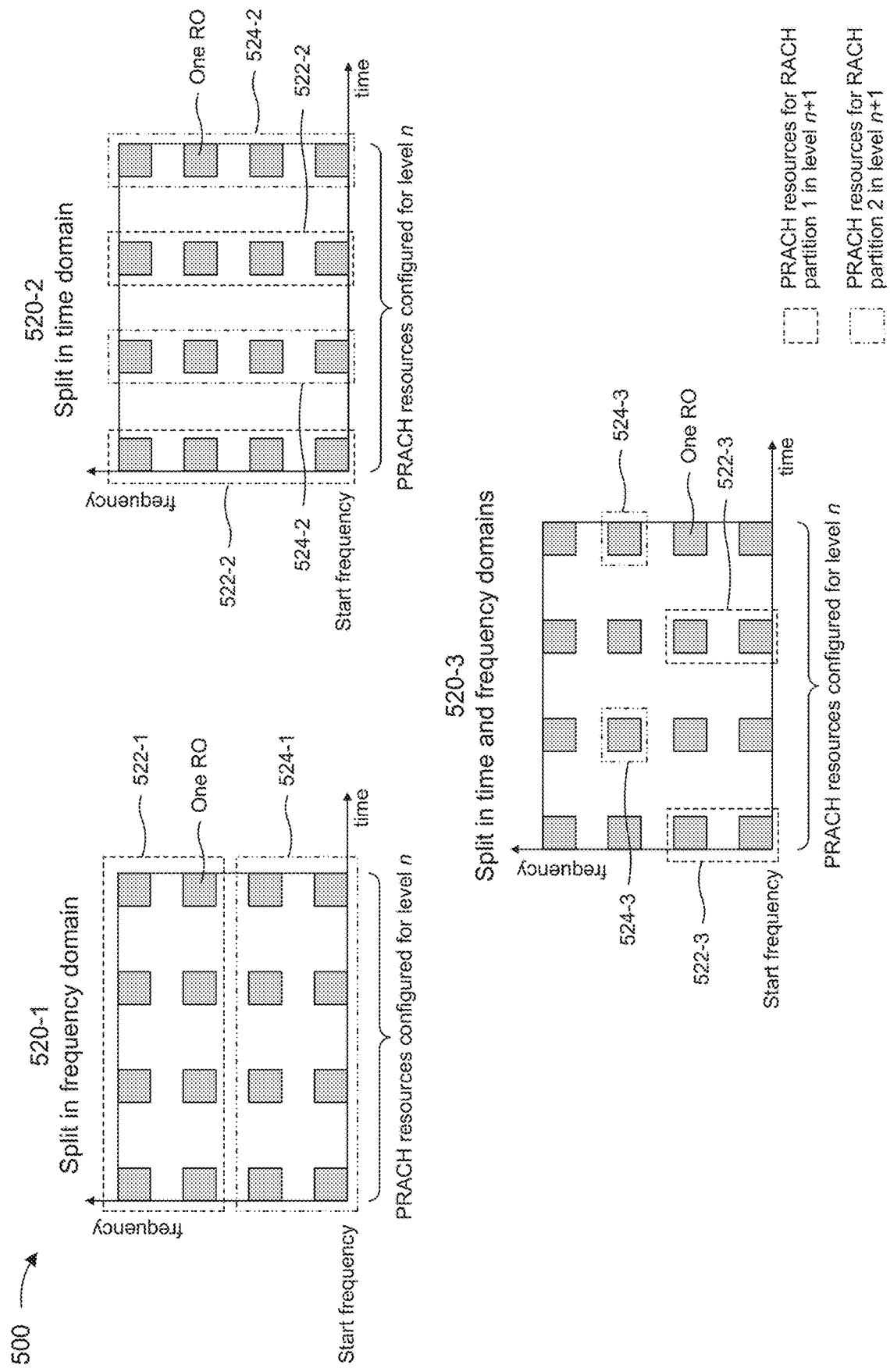
Figure 5C:
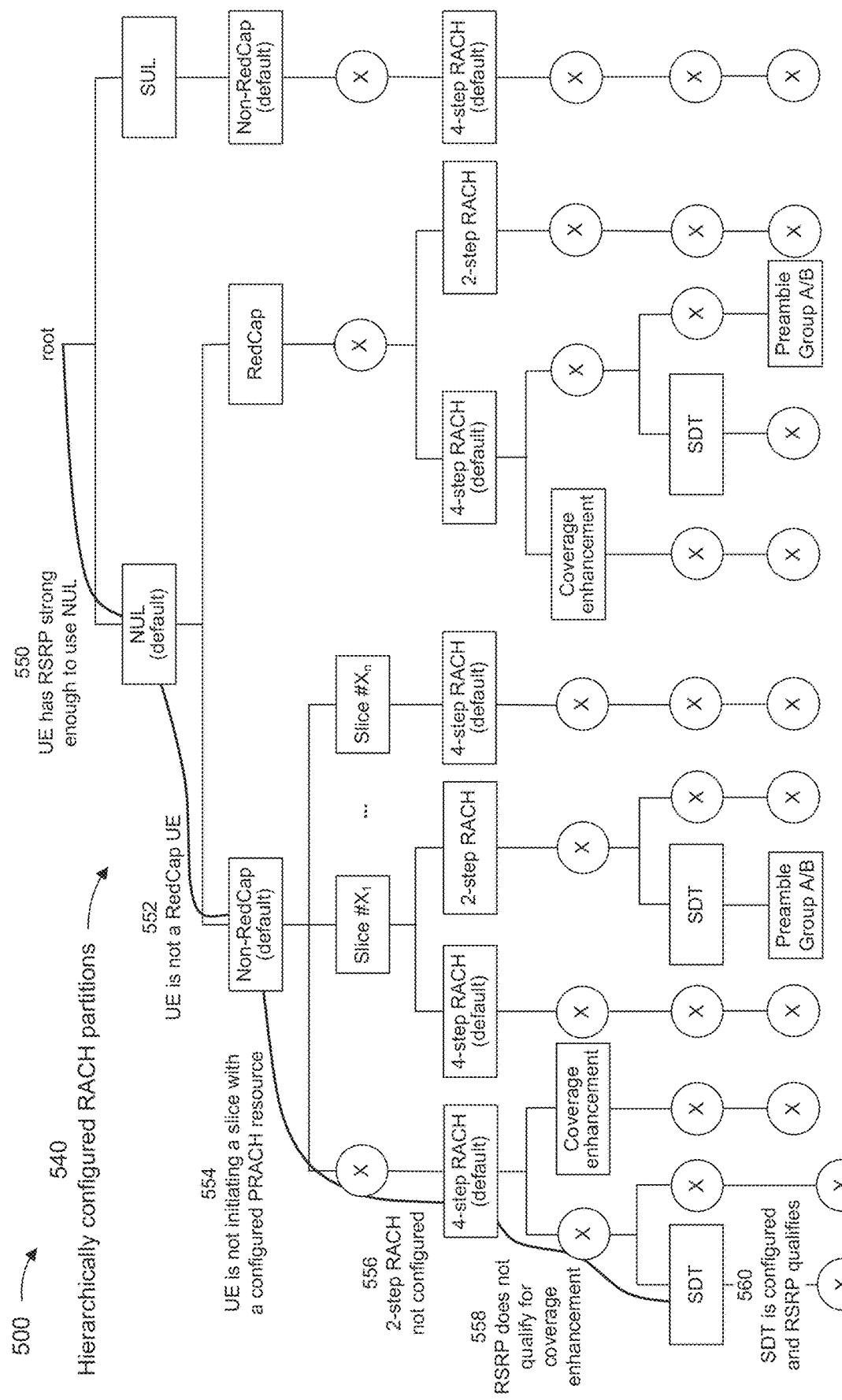

FIGS. 5A-5C are diagrams illustrating examples 500 associated with a unified approach to RACH partitioning and indication, in accordance with the present disclosure. As shown in FIG. 5A, examples 500 include communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 5A, and by reference number 510, the base station 110 may transmit, and the UE 120 may receive, random access configuration information that indicates multiple RACH partitions that are each associated with a combination of one or more RACH features configured by the base station 110 and PRACH resources associated with the configured combinations of RACH features. For example, in some aspects, the multiple RACH partitions may be configured hierarchically based on one or more rules that define relative priorities and/or orders associated with different RACH features. For example, as described herein, RACH features that may be associated with a configured RACH partition may include an uplink selection RACH feature (e.g., NUL versus SUL), a UE type RACH feature (e.g., RedCap versus non-RedCap), a network slicing RACH feature (e.g., where dedicated PRACH resources are allocated to a particular network slice or slice group), a RACH procedure type RACH feature (e.g., four-step RACH versus two-step RACH), a coverage enhancement RACH feature, an SDT RACH feature, and/or a preamble grouping RACH feature, among other examples.

In some aspects, as described herein, the multiple RACH partitions configured by the base station 110 may each be associated with a combination of one or more RACH features, and each RACH partition may be associated with a PRACH configuration that refers to resources in a time-frequency grid that are allocated to a respective RACH partition. For example, the base station 110 may configure a first RACH partition to support a combination that includes a four-step RACH feature and a coverage enhancement RACH feature and to support a second RACH partition for a combination that includes a two-step RACH feature and an SDT RACH feature. In general, each RACH partition may be associated with one or more RACH features that are compatible with one another. For example, in some cases, the UE 120 may trigger a RACH procedure that satisfies the criteria associated with multiple RACH features (e.g., the UE 120 may be a RedCap UE triggering a RACH-based SDT). In such cases, if the base station 110 were to have configured a first RACH partition for RedCap UEs and a second RACH partition for RACH-based SDT, the UE 120 may be limited to requesting special handling for only one of the two RACH features. Accordingly, in some aspects, the base station 110 may configure RACH partitions that are associated with a PRACH configuration for combinations of one or more RACH features that can be used together. For example, in cases where a number or expected load from RedCap UEs triggering RACH-based SDT satisfies a threshold, the base station 110 may configure a RACH partition that is dedicated to the combination of RedCap and SDT RACH features such that a UE satisfying both criteria can use the RACH partition to request special handling associated with RedCap UEs and RACH-based SDT.

Accordingly, as described herein, each RACH partition configured by the base station 110 may be associated with a PRACH configuration for a combination of one or more RACH features (e.g., one RACH partition may be associated with a separate PRACH configuration for a particular RACH feature and/or associated with a joint configuration between or among multiple RACH features). Furthermore, in cases where a RACH partition is associated with a combination of multiple (two or more) RACH features, the RACH features may generally be compatible with one another. For example, in some aspects, the base station 110 may generally not support a RACH partition in which a coverage enhancement RACH feature is jointly configured with a two-step RACH procedure because the coverage enhancement RACH feature includes multiple msg3 repetitions to improve PUSCH reliability for UEs with poor network coverage and the two-step RACH procedure does not include a msg3 (e.g., a third step). In another example, the base station 110 may not support a RACH partition in which the coverage enhancement RACH feature is jointly configured with an SDT RACH procedure because msg3 transmission is contention-based, whereby multiple PUSCH repetitions with a large payload can be resource expensive. Accordingly, in cases where the UE 120 has data to send but an RSRP measurement fails to satisfy a threshold, using a regular RRC connection to transmit the data may be more spectrally efficient and more power efficient than using RACH-based SDT to transfer the data.

In some aspects, other than restrictions due to incompatibility, the base station 110 may generally configure the multiple RACH partitions for a subset of all possible combinations of RACH features. For example, the base station 110 may support N RACH features, whereby the base station may configure up to $2^N$ RACH partitions for each possible combination of compatible RACH features. However, because PRACH resources are relatively expensive (e.g., based on a limited number of ROs and/or preambles that can be used to transmit a RAM), having an excessive number of RACH partitions may lead to unnecessary fragmentation of PRACH resources, especially in case where some combinations of RACH features have a low expected load. Accordingly, in some aspects, the base station 110 may have the flexibility to configure RACH partitions for all possible combinations of RACH features or only a subset of all possible combination of RACH features (e.g., based on expected load).

In some aspects, as described herein, each RACH partition that is configured by the base station 110 may be associated with a PRACH configuration, which may generally refer to resources in a time-frequency grid that are allocated to a respective RACH partition. For example, in some aspects, the base station 110 may configure one or more RACH partitions with dedicated PRACH resources that are orthogonal to all other RACH partitions. Additionally, or alternatively, the base station 110 may configure multiple RACH partitions to share a PRACH configuration. For example, in some aspects, two or more RACH partitions that share a PRACH configuration may each be allocated a non-overlapping set of ROs. Additionally, or alternatively, a set of contention-based preambles allocated to the PRACH configuration may be split among the two or more RACH partitions that share the PRACH configuration.

Additionally, or alternatively, in cases where multiple RACH partitions share a common PRACH configuration, the base station 110 may configure the PRACH resources associated with the multiple RACH partitions hierarchically to allocate PRACH resources more efficiently and/or reduce signaling overhead. For example, certain RACH features may be defined more generically or more specifically than other RACH features, whereby the combination of RACH features in a first RACH partition may be a superset of the combination of RACH features in a second RACH partition (e.g., where the first RACH partition is configured to support a combination of NUL, RedCap, four-step RACH, and coverage enhancement RACH features, and the second RACH partition is configured to support a combination of NUL, RedCap, and four-step RACH features). In such cases, the base station 110 may configure the ROs for the first RACH partition to be a subset of the ROs for the second RACH partition. Accordingly, in some aspects, the base station 110 may configure a PRACH mask to indicate a hierarchical configuration of PRACH resources (e.g., ROs that can be used to transmit a preamble and/or the preambles that can be transmitted in an RO). For example, in cases where a combination of RACH features in a first RACH partition are a superset of the combination of RACH features in a second RACH partition, and the two RACH partitions share the same PRACH configuration, the base station 110 can use the PRACH mask to indicate a subset of ROs and/or preambles allocated to the second RACH partition that are configured for the first RACH partition. In this way, using the PRACH mask to indicate the hierarchical configuration for RACH partitions that share a PRACH configuration may reduce signaling overhead, which may be particularly useful in practice because RACH configurations are typically signaled in SIB1, which is currently at or approaching a capacity limit.

For example, FIG. 5B illustrates various examples related to using a PRACH mask to indicate a hierarchical PRACH configuration for multiple RACH partitions that share a PRACH configuration. In the illustrated examples, the PRACH configuration may include PRACH resources that are configured for a RACH partition at level n of a hierarchy, which may be split among a first RACH partition and a second RACH partition at level n+1 of the hierarchy. For example, as shown by reference number 520-1, the PRACH resources that are configured at level n of the hierarchy may include a set of ROs in a time-frequency grid, which may be split in a frequency domain among the RACH partitions at level n+1. For example, reference number 522-1 depicts ROs that are allocated to the first RACH partition at level n+1, and reference number 524-1 depicts ROs that are allocated to the second RACH partition at level n+1, where the ROs allocated to the first and second RACH partitions at level n+1 are overlapping in the time domain and non-overlapping in the frequency domain. In another example, as shown by reference number 520-2, the PRACH resources that are configured at level n of the hierarchy may be split in a time domain among the RACH partitions at level n+1. For example, reference number 522-2 depicts ROs that are allocated to the first RACH partition at level n+1, and reference number 524-2 depicts ROs that are allocated to the second RACH partition at level n+1, where the ROs allocated to the first and second RACH partitions at level n+1 are non-overlapping in the time domain and overlapping in the frequency domain. In another example, as shown by reference number 520-3, the PRACH resources that are configured at level n of the hierarchy may be split in the time and frequency domain among the RACH partitions at level n+1. For example, reference number 522-3 depicts ROs that are allocated to the first RACH partition at level n+1, and reference number 524-3 depicts ROs that are allocated to the second RACH partition at level n+1, where the first and second RACH partitions are allocated disjoint sets of ROs within the PRACH configuration of a parent RACH partition.

Accordingly, in some aspects, PRACH resources that are configured for a RACH partition at level n+1 may be configured hierarchically, within the PRACH resources that are configured for a parent RACH partition at level n, or a RACH partition at level n+1 may be associated with a dedicated PRACH configuration. In some aspects, the base station 110 may generally define a dedicated PRACH configuration for a RACH partition at higher levels in the hierarchy (e.g., closer to a root of the hierarchy) where available PRACH resources may be less scarce. Furthermore, in cases where multiple RACH partitions at the same level in the hierarchy share a common parent, the multiple RACH partitions may be allocated disjoint sets of ROs within the PRACH configuration of the common parent (e.g., as shown in FIG. 5B), disjoint sets of preambles that can be transmitted in the same set of ROs within the PRACH configuration of the common parent, or a combination thereof.

Furthermore, in some aspects, similar principles may be applied to RACH transmission parameters for different RACH partitions. For example, in some aspects, RACH transmission parameters (e.g., parameters for transmitting a preamble or a RAM) may include total number of RACH preambles that can be transmitted, a target received power associated with a transmitted RACH preamble, a maximum transmit power, a power ramping step, and/or a response window, among other examples. Accordingly, in some aspects, the base station 110 may configure specific RACH transmission parameters for a RACH partition at any level in the hierarchy, where the RACH transmission parameters may be specified in a RACH-ConfigGeneric element, a RACH-ConfigCommon element, a RACH-ConfigGenericTwoStepRA element, and/or a RACH-ConfigCommonTwoStepRA element, among other examples. However, in practice, one or more RACH transmission parameters may be the same across different RACH partitions, whereby repeating the RACH transmission parameters in one or more SIBs for each RACH partition can lead to significant signaling overhead, especially when the base station 110 has configured a large number of RACH partitions. Accordingly, in some aspects, one or more RACH transmission parameters may be inherited between different RACH partitions. For example, in cases where the combination of RACH features in a first RACH partition are a superset of the combination of RACH features in a second RACH partition, the first RACH partition may inherit shared RACH transmission parameters from the second RACH partition, unless the base station 110 configures a dedicated value for the RACH parameter for the first RACH partition. In other words, in cases where a RACH transmission parameter is not configured for a RACH partition at level n+1 of the hierarchy, the RACH partition at level n+1 of the hierarchy may inherit a value of the unconfigured RACH transmission parameter from a closest parent (e.g., at level n or higher within the hierarchy). For example, if there are no dedicated RACH transmission parameters configured for a RACH partition that supports an SDT RACH feature, the RACH partition may inherit the dedicated RACH transmission parameters from a parent RACH partition configured for two-step RACH.

Referring again to FIG. 5A, as shown by reference number 530, the UE 120 may select a RACH partition, from the multiple RACH partitions configured by the base station 110. In some cases, the UE 120 may generally select the RACH partition based on the UE 120 satisfying one or more criteria for the combination of RACH features associated with the selected RACH partition. In some aspects, in cases where the UE 120 satisfies the criteria associated with M individual RACH features and the base station 110 has configured a RACH partition for a combination of the M individual RACH features, the UE 120 may select the RACH partition for the combination of the M individual RACH features satisfied by the UE 120. However, in some cases, the base station 110 may have not configured a RACH partition for the specific combination of the M individual RACH features satisfied by the UE 120. For example, the UE 120 may be a non-RedCap UE that triggers a RACH procedure for a network slice and the UE 120 may further satisfy an RSRP criterion associated with an SDT RACH feature, but the base station 110 may have configured only a first RACH partition for a four-step RACH for the network slice and a second RACH partition for a two-step RACH for SDT. In such cases, the UE 120 may need to select whether to use the first RACH partition or the second RACH partition.

Accordingly, in cases where the UE 120 satisfies the criteria for more than one RACH partition, the UE 120 may apply one or more rules that define relative priorities among different RACH features to select the RACH partition to be used to transmit a preamble. In some aspects, as described herein, the one or more rules may be defined in one or more wireless communication standards, as the relative priorities among different RACH features may be relatively static and may not have significant variation across different cells. Furthermore, the rules may be specified in wireless communication standards to avoid having to signal the one or more rules in system information, which may reduce signaling overhead associated with SIBs (e.g., SIB1, which carries most RACH-related configuration information and is approaching a capacity limit). Alternatively, in some aspects, the one or more rules that define the relative priorities among different RACH features may be advertised or otherwise signaled in system information transmitted by the base station 110, which may provide the base station 110 with more flexibility to configure RACH partitions based on an expected load associated with different RACH features. For example, in some aspects, the base station 110 may advertise the priority associated with a particular RACH feature in system information using a tuple that includes elements to identify the RACH feature, the priority level for the RACH feature, and one or more RACH configuration parameters for the RACH feature (e.g., PRACH configuration and/or RACH transmission parameters, among other examples). In either case, because the base station 110 knows the relative priorities that the UE 120 uses to select the RACH partition, the base station 110 may accurately estimate access load by different types of UEs and/or events, and RACH performance may be more consistent because different UE implementations do not vary in how different RACH features are prioritized.

In some aspects, in cases where the one or more rules that define the relative priorities among different RACH features are specified (e.g., in one or more wireless communication standards), the one or more rules may be designed based on one or more RACH features being more generic (or more specific) than other RACH features. For example, the four-step RACH procedure is generally the default or legacy RACH feature that serves as the foundation or basis for all enhanced RACH features, including two-step RACH, RedCap, network slices, coverage enhancement, SDT, and/or preamble groupings. Furthermore, the SDT RACH feature may be compatible with all other RACH features, with the exception of the coverage enhancement RACH feature, as described elsewhere herein. Furthermore, in legacy techniques, certain RACH features may be considered first before other RACH features are selected, whereby the one or more rules may be designed to be consistent with legacy procedures to ensure backward compatibility (e.g., when a RACH procedure is initiated, the UE 120 first decides whether to use an NUL or an SUL in cases where PRACH resources are configured on the SUL).

For example, in some aspects, the one or more rules may assign a highest priority to uplink selection, where the UE 120 may first select whether to use an NUL or an SUL to initiate a RACH procedure if PRACH resources are configured for the SUL. For example, in some aspects, the UE 120 may select the NUL in cases where an RSRP measurement satisfies a threshold, or the UE 120 may select the SUL in cases where the RSRP measurement fails to satisfy the threshold. In some aspects, the one or more rules may specify a next highest priority for RACH partitions that are specifically configured for RedCap UEs, whereby a RedCap UE may select the RACH partitions specifically configured for RedCap UEs before evaluating any other RACH features because the base station 110 may handle RedCap UEs differently and use the dedicated PRACH resources associated with the RACH partition to identify the UE 120 as a RedCap UE early (e.g., for the purpose of access restriction). Among the remaining RACH features (e.g., network slicing, random access type, coverage enhancement, SDT, and preamble group A/B), network slicing may have a next highest priority to ensure that differentiated and/or prioritized handling is enabled for all RACH procedures associated with a network slice (or slice group) that has dedicated PRACH resources configured. Among the remaining RACH features (e.g., random access type, coverage enhancement, SDT, and preamble group A/B), random access type may have a next highest priority because coverage enhancement, SDT, and preamble group A/B are all configured for a specific random access type (e.g., four-step or two-step). Among the coverage enhancement, SDT, and preamble group A/B RACH features, preamble group A/B may have a lowest priority in the selection logic because preamble group A/B works with both coverage enhancement and SDT features. For example, the preamble group A/B RACH feature may partition preamble sequences into Group A, which are selected when uplink data to be sent has a relatively small payload size or when the UE 120 has poor coverage, and into Group B, which are selected when uplink data to be sent has a relatively large payload size or when the UE 120 has good coverage. In other words, the preamble group A/B RACH feature takes payload size and coverage into consideration, whereby the preamble group A/B RACH feature may be compatible with both coverage enhancement and SDT RACH features. Furthermore, between the coverage enhancement and SDT RACH features, relative priorities may be equal (e.g., between random access type and preamble group A/B) since the base station 110 may lack support to jointly configure the coverage enhancement and SDT RACH features.

Accordingly, in some aspects, the UE 120 may select which RACH partition to use to transmit a preamble to initiate a RACH procedure based on a prioritized order of RACH features, which may assign a highest priority to uplink selection, a next highest priority to UE type, a next highest priority to network slicing, a next highest priority to a random access type, a next highest priority to coverage enhancement or SDT, and a lowest priority to preamble group A/B. For example, referring to FIG. 5C, reference number 540 depicts an example of hierarchically configured RACH partitions, where each rectangular node corresponds to a RACH feature (e.g., a RACH procedure type and/or RACH enhancement), and each circular node with an 'X' inside indicates that the base station 110 has either not configured a RACH partition in a branch at the corresponding level or that the UE 120 does not satisfy the criteria for that RACH partition. Accordingly, as shown in FIG. 5C, the RACH partitions configured by the base station 110 may be organized hierarchically according to the one or more rules that define the relative priorities among different RACH features, where each path starting from a root of the hierarchical tree represents a configured RACH partition.

Accordingly, to select a RACH partition to be used to initiate a RACH procedure, the UE 120 may generally start with a RACH feature that has a highest priority (e.g., NUL versus SUL) and may then determine whether the UE 120 satisfies the criteria to use the RACH feature within the current priority level and/or determine which of the criteria is satisfied by the UE 120. For example, within each level of the hierarchical tree with at least one option configured, the UE 120 may determine whether one or more associated criteria are satisfied, and the UE 120 may continue to a child branch of that option if the one or more associated criteria are satisfied. Otherwise, the UE 120 may continue to a child branch with a circular node (e.g., "not configured"). In cases where the UE 120 satisfies the criteria of more than one option at a particular level, the UE 120 may follow the one or more priority rules specified in wireless communication standards and/or signaling from the base station. In cases where a RACH partition is not configured in a level (e.g., the coverage enhancement RACH feature is not configured), the UE 120 may skip that level and move to the next highest level. The UE 120 may repeat the above steps until the criteria of all levels have been checked and the UE 120 arrives at the selected RACH partition.

For example, FIG. 5C illustrates an example of selection logic that may be applied by the UE 120 given the particular combination of configured RACH partitions depicted therein. For example, as shown by reference number 550, the UE 120 may first decide whether to use an NUL (default) RACH partition to initiate a RACH procedure or an SUL RACH partition to initiate the RACH procedure. In this case, the UE 120 may have an RSRP measurement that satisfies a threshold that is sufficient to use the NUL. As further shown, the base station 110 may have configured a first RACH partition for RedCap UEs and a second RACH partition for non-RedCap UEs at the next level under the NUL. In this case, as shown by reference number 552, the UE 120 may select the non-RedCap partition based on the UE 120 not being a RedCap UE. As further shown by reference number 554, the UE 120 may not be initiating the RACH procedure in a slice with a dedicated or otherwise configured PRACH resource and may therefore follow the branch with the circular (not configured) node. As further shown by reference number 556, only a four-step RACH is configured for non-RedCap UEs that are not initiating a RACH procedure in a network slice. At a next level, as shown by reference number 558, the UE 120 may have an RSRP measurement that fails to satisfy (e.g., equals or exceeds) a threshold associated with the coverage enhancement RACH feature. However, as shown by reference number 560, the UE 120 may have an RSRP measurement that satisfies (e.g., equals or exceeds) a threshold associated with the SDT RACH feature, which is associated with a configured RACH partition. Accordingly, the UE 120 may select the RACH partition associated with the SDT RACH feature, and the UE 120 may use an NUL and an associated PRACH resource to transmit a msg1 preamble to initiate a four-step RACH procedure that supports SDT.

Referring again to FIG. 5A, as shown by reference number 570, the UE 120 may transmit a preamble to initiate a RACH procedure that supports the combination of RACH features associated with the selected RACH partition. For example, as described above, a RACH partition may be associated with a PRACH configuration, which may include a set of ROs and/or a set of preambles that can be used to initiate a RACH procedure associated with a particular combination of RACH features. Accordingly, the UE 120 may select a preamble to be transmitted based on the set of preambles that are allocated to the RACH partition selected by the UE 120, and the UE 120 may transmit the selected preamble in an RO allocated to the RACH partition selected by the UE 120. Furthermore, in some aspects, the UE 120 may transmit the preamble using one or more RACH transmission parameters that are configured for the selected RACH partition and/or inherited from a closest parent of the selected RACH partition.

As further shown in FIG. 5A, and by reference number 580, the UE 120 and the base station 110 may then further communicate one or more remaining messages associated with the RACH procedure based on the selected RACH partition. For example, based on the preamble and/or RO used by the UE 120 to initiate the RACH procedure, the base station 110 may determine the particular combination of RACH features associated with the RACH feature such that subsequent messages of the RACH procedure can be subject to any special handling associated with the particular combination of RACH features.

Furthermore, in certain circumstances, the remaining RACH procedure may be used to activate an on-demand RACH partition that the base station 110 may have not previously configured. For example, as described herein, configuring many RACH partitions (potentially as many as $2^N$) is resource expensive, particularly when a particular RACH partition has a low expected load. On the other hand, in cases where a RACH partition for a particular combination of RACH features is not configured, the base station 110 may have difficulty accurately estimating how many UEs can benefit from that RACH partition (e.g., because any UEs that may have selected that RACH partition would have used other RACH partitions that are configured). Accordingly, in some aspects, the base station 110 may support one or more on-demand RACH partitions. For example, in some aspects, the base station 110 may transmit system information or other signaling indicating one or more RACH partitions or combinations of RACH features that are supported by the base station 110 but without any currently allocated PRACH resources, which may be referred to herein as on-demand RACH partitions (ODRP). In cases where the UE 120 satisfies the criteria associated with the combination of RACH features in an ODRP, the UE 120 may first use a legacy RACH procedure (e.g., a four-step RACH procedure) that indicates which ODRP the UE 120 is requesting. In some aspects, the ODRP indication may be signaled in an uplink message of the legacy RACH procedure (e.g., in either msg1 or msg3), and the base station 110 may provide configuration information for the requested ODRP in a downlink message of the legacy RACH procedure (e.g., in either msg2 or msg4). The UE 120 may then re-initiate the RACH procedure using the configuration information associated with the requested ODRP. In this way, PRACH resources may be used more efficiently by allocating ROs and/or preambles to requested ODRPs.

As indicated above, FIGS. 5A-5C are provided as examples. Other examples may differ from what is described with respect to FIGS. 5A-5C.

Figure 6:
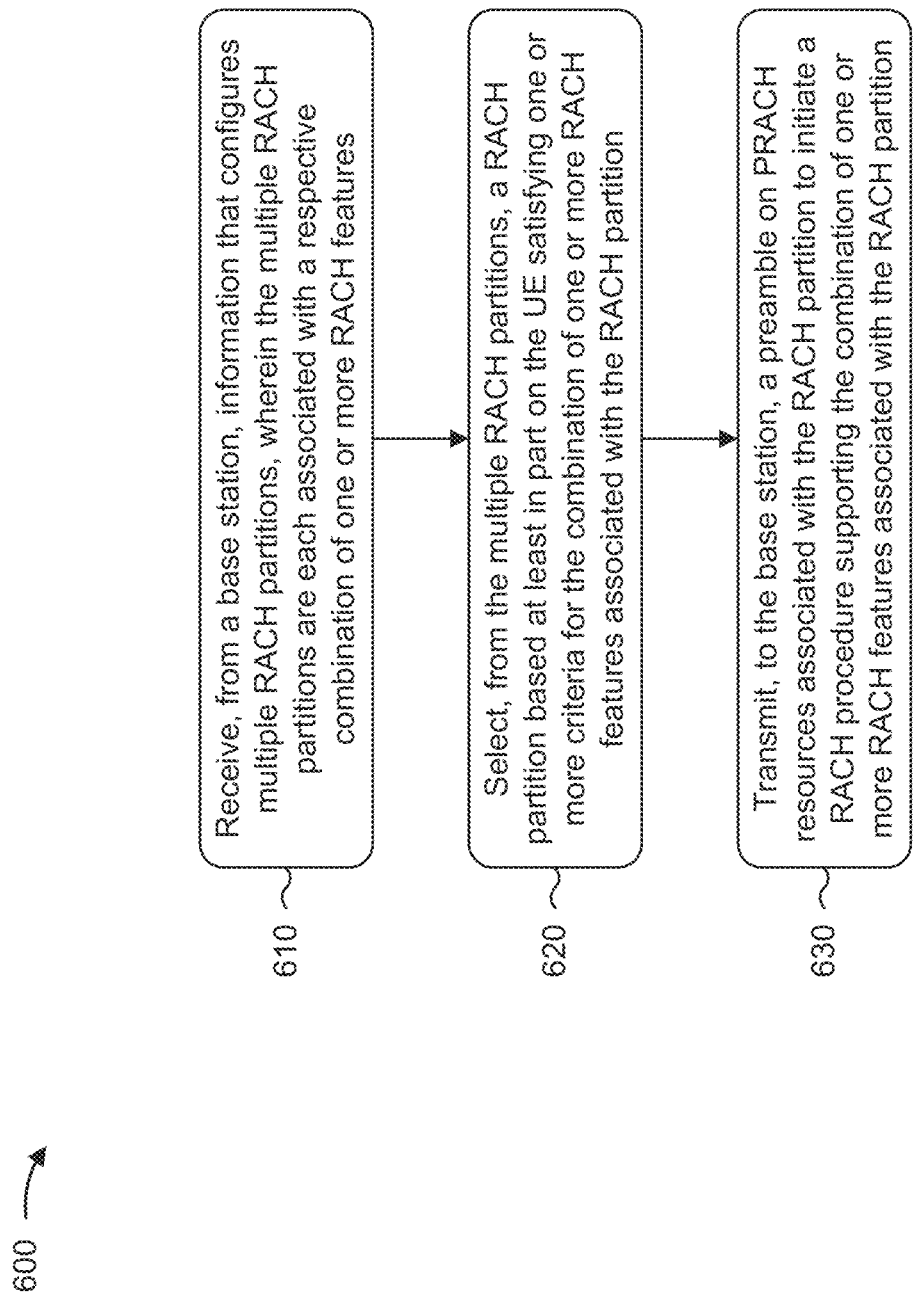
FIGS. 6-7 are diagrams illustrating example processes associated with a unified approach to RACH partitioning and indication, in accordance with the present disclosure.

FIG. 6 is a diagram illustrating an example process 600 performed, for example, by a UE, in accordance with the present disclosure. Example process 600 is an example where the UE (e.g., UE 120) performs operations associated with a unified approach to RACH partitioning and indication.

As shown in FIG. 6, in some aspects, process 600 may include receiving, from a base station, information that configures multiple RACH partitions, wherein the multiple RACH partitions are each associated with a respective combination of one or more RACH features (block 610). For example, the UE (e.g., using communication manager 140 and/or reception component 802, depicted in FIG. 8) may receive, from a base station, information that configures multiple RACH partitions, wherein the multiple RACH partitions are each associated with a respective combination of one or more RACH features, as described above.

As further shown in FIG. 6, in some aspects, process 600 may include selecting, from the multiple RACH partitions, a RACH partition based at least in part on the UE satisfying one or more criteria for the combination of one or more RACH features associated with the RACH partition (block 620). For example, the UE (e.g., using communication manager 140 and/or selection component 808, depicted in FIG. 8) may select, from the multiple RACH partitions, a RACH partition based at least in part on the UE satisfying one or more criteria for the combination of one or more RACH features associated with the RACH partition, as described above.

As further shown in FIG. 6, in some aspects, process 600 may include transmitting, to the base station, a preamble on PRACH resources associated with the RACH partition to initiate a RACH procedure supporting the combination of one or more RACH features associated with the RACH partition (block 630). For example, the UE (e.g., using communication manager 140 and/or transmission component 804, depicted in FIG. 8) may transmit, to the base station, a preamble on PRACH resources associated with the RACH partition to initiate a RACH procedure supporting the combination of one or more RACH features associated with the RACH partition, as described above.

Process 600 may include additional aspects, such as any single aspect or any combination of aspects described below and/or in connection with one or more other processes described elsewhere herein.

In a first aspect, one or more RACH partitions, of the multiple RACH partitions, includes PRACH resources that are jointly configured for a combination of multiple RACH features.

In a second aspect, alone or in combination with the first aspect, for each RACH partition, the RACH features in the respective combination of one or more RACH features associated with the RACH partition are compatible with one another.

In a third aspect, alone or in combination with the first aspect and second aspects, the multiple RACH partitions that are configured include a subset of all possible combinations of one or more RACH features.

In a fourth aspect, alone or in combination with one or more of the first through third aspects, selecting the RACH partition includes determining that the UE satisfies the one or more criteria for the combination of one or more RACH features associated with at least a first RACH partition and a second RACH partition, wherein the RACH partition is selected based at least in part on one or more rules that define relative priorities among different RACH features.

In a fifth aspect, alone or in combination with one or more of the first through fourth aspects, the one or more rules are specified in one or more wireless communication standards.

In a sixth aspect, alone or in combination with one or more of the first through fifth aspects, the one or more rules are configured in system information broadcasted by the base station.

In a seventh aspect, alone or in combination with one or more of the first through sixth aspects, the one or more rules define the relative priorities among the different RACH features according to a hierarchical tree in which each level corresponds to a particular RACH feature.

In a eighth aspect, alone or in combination with one or more of the first through seventh aspects, the hierarchical tree includes multiple paths, starting from a root of the hierarchical tree, that each correspond to a respective RACH partition, of the multiple RACH partitions.

In a ninth aspect, alone or in combination with one or more of the first through eighth aspects, the one or more rules define a prioritized order for a first RACH feature associated with uplink selection, a second RACH feature associated with a UE type, a third RACH feature associated with network slicing, a fourth RACH feature associated with a RACH procedure type, a fifth RACH feature associated with a coverage enhancement, a sixth RACH feature associated with an SDT, and a seventh RACH feature associated with preamble groupings.

In a tenth aspect, alone or in combination with one or more of the first through ninth aspects, the prioritized order includes a highest priority for the first RACH feature associated with uplink selection, a next highest priority for the second RACH feature associated with the UE type, a next highest priority for the third RACH feature associated with network slicing, a next highest priority for the fourth RACH feature associated with the RACH procedure type, a next highest priority for one or more of the fifth RACH feature associated with the coverage enhancement or the sixth RACH feature associated with the SDT, and a lowest priority for the seventh RACH feature associated with preamble groupings.

In an eleventh aspect, alone or in combination with one or more of the first through tenth aspects, the multiple RACH partitions include at least one RACH partition associated with a dedicated PRACH configuration.

In an twelfth aspect, alone or in combination with one or more of the first through eleventh aspects, the multiple RACH partitions include at least a first RACH partition and a second RACH partition that share a PRACH configuration with non-overlapping RACH occasions or preambles split between the first RACH partition and the second RACH partition.

In a thirteenth aspect, alone or in combination with one or more of the first through twelfth aspects, the multiple RACH partitions include at least a first RACH partition and a second RACH partition that share a PRACH configuration with a PRACH mask indicating a hierarchical configuration for RACH occasions or preambles associated with the PRACH configuration based at least in part on a relationship between a first combination of one or more RACH features associated with the first RACH partition and a second combination of one or more RACH features associated with the second RACH partition.

In a fourteenth aspect, alone or in combination with one or more of the first through thirteenth aspects, the preamble is transmitted using at least one RACH parameter having a value inherited from another RACH partition that has one or more RACH features in common with the RACH partition selected by the UE.

In a fifteenth aspect, alone or in combination with one or more of the first through fourteenth aspects, process 600 includes receiving information that indicates one or more on-demand RACH partitions that are supported by the base station without allocated PRACH resources, requesting, in an uplink message of the RACH procedure, an on-demand RACH partition, of the one or more on-demand RACH partitions supported by the base station, based at least in part on the UE satisfying one or more criteria for a combination of one or more RACH features associated with the on-demand RACH partition, receiving, in a downlink message of the RACH procedure, a PRACH configuration associated with the on-demand RACH partition, and transmitting, to the base station, a preamble on PRACH resources associated with the on-demand RACH partition to initiate a new RACH procedure supporting the combination of one or more RACH features associated with the on-demand RACH partition.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
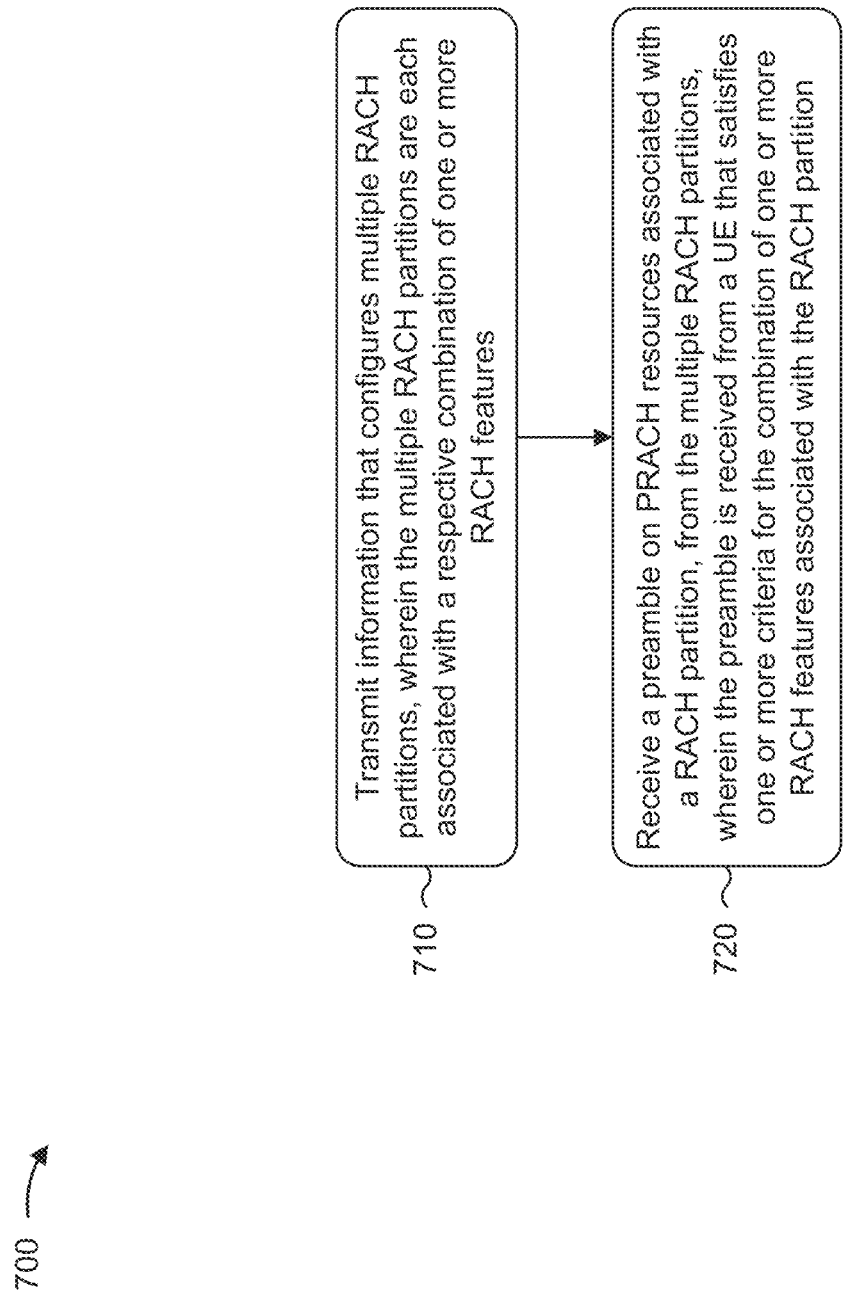

FIG. 7 is a diagram illustrating an example process 700 performed, for example, by a base station, in accordance with the present disclosure. Example process 700 is an example where the base station (e.g., base station 110) performs operations associated with a unified approach to RACH partitioning and indication.

As shown in FIG. 7, in some aspects, process 700 may include transmitting information that configures multiple RACH partitions, wherein the multiple RACH partitions are each associated with a respective combination of one or more RACH features (block 710). For example, the base station (e.g., using communication manager 150 and/or transmission component 904, depicted in FIG. 9) may transmit information that configures multiple RACH partitions, wherein the multiple RACH partitions are each associated with a respective combination of one or more RACH features, as described above.

As further shown in FIG. 7, in some aspects, process 700 may include receiving a preamble on PRACH resources associated with a RACH partition, from the multiple RACH partitions, wherein the preamble is received from a UE that satisfies one or more criteria for the combination of one or more RACH features associated with the RACH partition (block 720). For example, the base station (e.g., using communication manager 150 and/or reception component 902, depicted in FIG. 9) may receive a preamble on PRACH resources associated with a RACH partition, from the multiple RACH partitions, wherein the preamble is received from a UE that satisfies one or more criteria for the combination of one or more RACH features associated with the RACH partition, as described above.

Process 700 may include additional aspects, such as any single aspect or any combination of aspects described below and/or in connection with one or more other processes described elsewhere herein.

In a first aspect, one or more RACH partitions, of the multiple RACH partitions, includes PRACH resources that are jointly configured for a combination of multiple RACH features.

In a second aspect, alone or in combination with the first aspect, for each RACH partition, the RACH features in the respective combination of one or more RACH features associated with the RACH partition are compatible with one another.

In a third aspect, alone or in combination with one or more of the first and second aspects, the multiple RACH partitions that are configured include a subset of all possible combinations of one or more RACH features.

In a fourth aspect, alone or in combination with one or more of the first through third aspects, the RACH partition is selected based at least in part on one or more rules that define relative priorities among different RACH features.

In a fifth aspect, alone or in combination with one or more of the first through fourth aspects, the one or more rules are specified in one or more wireless communication standards.

In a sixth aspect, alone or in combination with one or more of the first through fifth aspects, the one or more rules are configured in system information broadcasted by the base station.

In a seventh aspect, alone or in combination with one or more of the first through sixth aspects, the one or more rules define the relative priorities among the different RACH features according to a hierarchical tree in which each level corresponds to a particular RACH feature.

In an eighth aspect, alone or in combination with one or more of the first through seventh aspects, the hierarchical tree includes multiple paths, starting from a root of the hierarchical tree, that each correspond to a respective RACH partition, of the multiple RACH partitions.

In a ninth aspect, alone or in combination with one or more of the first through eighth aspects, the one or more rules define a prioritized order for a first RACH feature associated with uplink selection, a second RACH feature associated with a UE type, a third RACH feature associated with network slicing, a fourth RACH feature associated with a RACH procedure type, a fifth RACH feature associated with a coverage enhancement, a sixth RACH feature associated with an SDT, and a seventh RACH feature associated with preamble groupings.

In a tenth aspect, alone or in combination with one or more of the first through ninth aspects, the prioritized order includes a highest priority for the first RACH feature associated with uplink selection, a next highest priority for the second RACH feature associated with the UE type, a next highest priority for the third RACH feature associated with network slicing, a next highest priority for the fourth RACH feature associated with the RACH procedure type, a next highest priority for one or more of the fifth RACH feature associated with the coverage enhancement or the sixth RACH feature associated with the SDT, and a lowest priority for the seventh RACH feature associated with preamble groupings.

In an eleventh aspect, alone or in combination with one or more of the first through tenth aspects, the multiple RACH partitions include at least one RACH partition associated with a dedicated PRACH configuration.

In a twelfth aspect, alone or in combination with one or more of the first through eleventh aspects, the multiple RACH partitions include at least a first RACH partition and a second RACH partition that share a PRACH configuration with non-overlapping RACH occasions or preambles split between the first RACH partition and the second RACH partition.

In a thirteenth aspect, alone or in combination with one or more of the first through twelfth aspects, the multiple RACH partitions include at least a first RACH partition and a second RACH partition that share a PRACH configuration with a PRACH mask indicating a hierarchical configuration for RACH occasions or preambles associated with the PRACH configuration based at least in part on a relationship between a first combination of one or more RACH features associated with the first RACH partition and a second combination of one or more RACH features associated with the second RACH partition.

In a fourteenth aspect, alone or in combination with one or more of the first through thirteenth aspects, the preamble is transmitted using at least one RACH parameter having a value inherited from another RACH partition that has one or more RACH features in common with the RACH partition selected by the UE.

In a fifteenth aspect, alone or in combination with one or more of the first through fourteenth aspects, process 700 includes transmitting information that indicates one or more on-demand RACH partitions that are supported by the base station without allocated PRACH resources, receiving, in an uplink message of the RACH procedure, a request for an on-demand RACH partition, of the one or more on-demand RACH partitions supported by the base station, based at least in part on the UE satisfying one or more criteria for a combination of one or more RACH features associated with the on-demand RACH partition, transmitting, in a downlink message of the RACH procedure, a PRACH configuration associated with the on-demand RACH partition, and receiving, from the UE, a preamble on PRACH resources associated with the on-demand RACH partition to initiate a new RACH procedure supporting the combination of one or more RACH features associated with the on-demand RACH partition.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
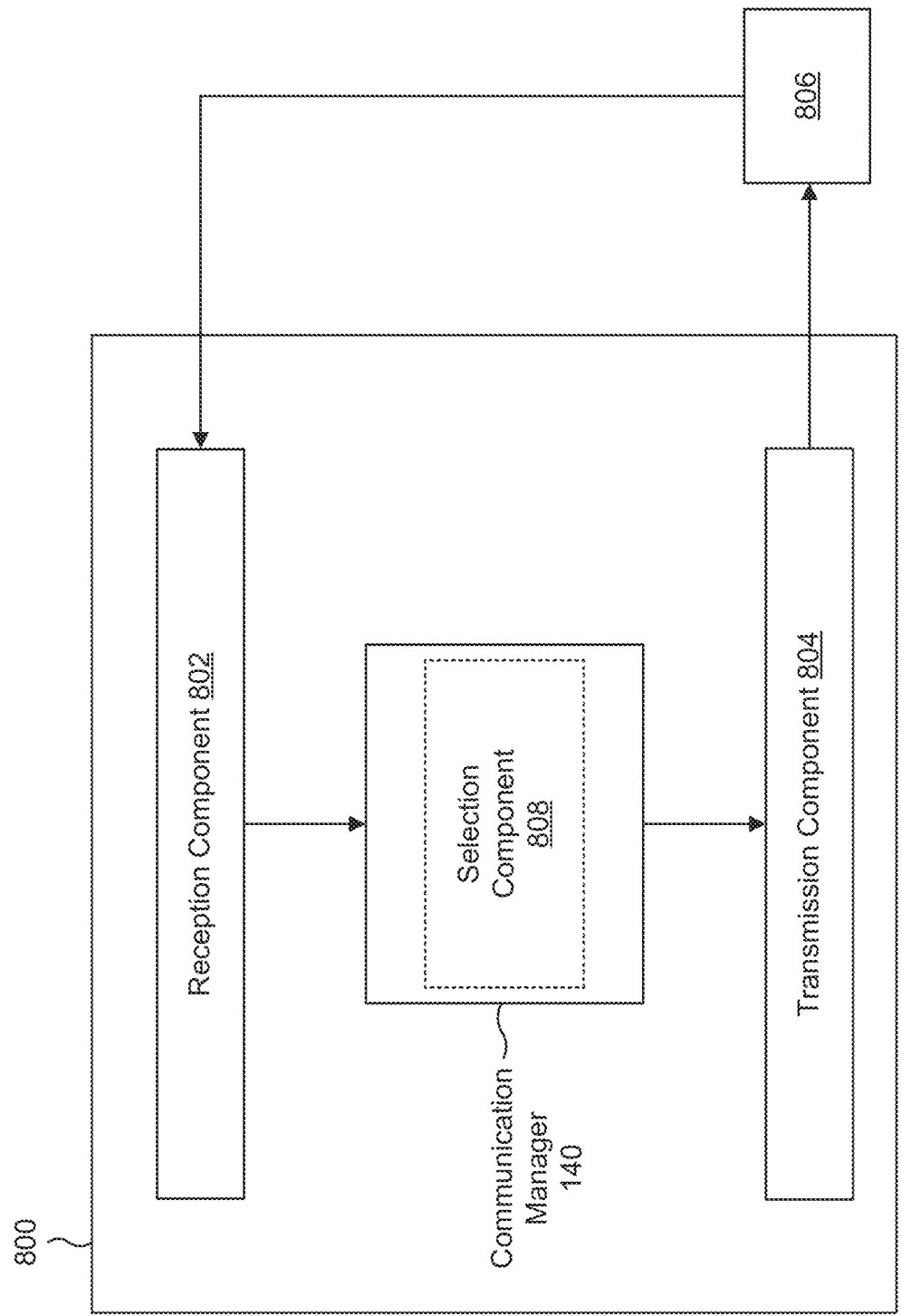
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a selection component 808, among other examples.

In some aspects, the apparatus 800 may be configured to perform one or more operations described herein in connection with FIGS. 5A-5C. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a base station, information that configures multiple RACH partitions, wherein the multiple RACH partitions are each associated with a respective combination of one or more RACH features. The selection component 808 may select, from the multiple RACH partitions, a RACH partition based at least in part on the UE satisfying one or more criteria for the combination of one or more RACH features associated with the RACH partition. The transmission component 804 may transmit, to the base station, a preamble on PRACH resources associated with the RACH partition to initiate a RACH procedure supporting the combination of one or more RACH features associated with the RACH partition.

The reception component 802 may receive information that indicates one or more on-demand RACH partitions that are supported by the base station without allocated PRACH resources. The transmission component 804 may request, in an uplink message of the RACH procedure, an on-demand RACH partition, of the one or more on-demand RACH partitions supported by the base station, based at least in part on the UE satisfying one or more criteria for a combination of one or more RACH features associated with the on-demand RACH partition. The reception component 802 may receive, in a downlink message of the RACH procedure, a PRACH configuration associated with the on-demand RACH partition. The transmission component 804 may transmit, to the base station, a preamble on PRACH resources associated with the on-demand RACH partition to initiate a new RACH procedure supporting the combination of one or more RACH features associated with the on-demand RACH partition.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
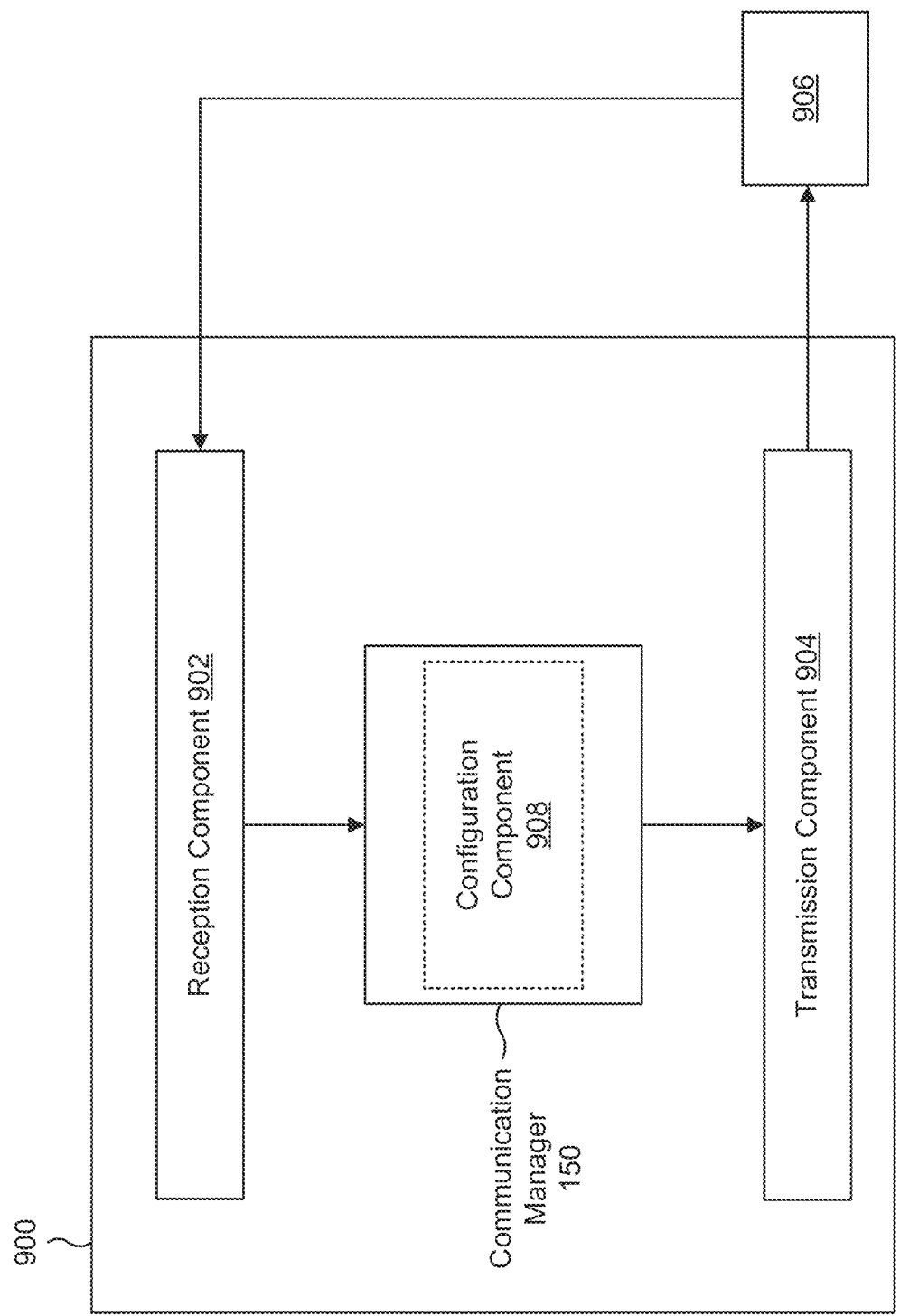

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a configuration component 908, among other examples.

In some aspects, the apparatus 900 may be configured to perform one or more operations described herein in connection with FIGS. 5A-5C. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The configuration component 908 may configure multiple RACH partitions that are each associated with a respective combination of one or more RACH features. The transmission component 904 may transmit information that configures the multiple RACH partitions. The reception component 902 may receive a preamble on PRACH resources associated with a RACH partition, from the multiple RACH partitions, wherein the preamble is received from a UE that satisfies one or more criteria for the combination of one or more RACH features associated with the RACH partition.

The transmission component 904 may transmit information that indicates one or more on-demand RACH partitions that are supported by the base station without allocated PRACH resources. The reception component 902 may receive, in an uplink message of the RACH procedure, a request for an on-demand RACH partition, of the one or more on-demand RACH partitions supported by the base station, based at least in part on the UE satisfying one or more criteria for a combination of one or more RACH features associated with the on-demand RACH partition. The transmission component 904 may transmit, in a downlink message of the RACH procedure, a PRACH configuration associated with the on-demand RACH partition. The reception component 902 may receive, from the UE, a preamble on PRACH resources associated with the on-demand RACH partition to initiate a new RACH procedure supporting the combination of one or more RACH features associated with the on-demand RACH partition.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a base station, information that configures multiple RACH partitions, wherein the multiple RACH partitions are each associated with a respective combination of one or more RACH features; selecting, from the multiple RACH partitions, a RACH partition based at least in part on the UE satisfying one or more criteria for the combination of one or more RACH features associated with the RACH partition; and transmitting, to the base station, a preamble on PRACH resources associated with the RACH partition to initiate a RACH procedure supporting the combination of one or more RACH features associated with the RACH partition.

Aspect 2: The method of Aspect 1, wherein one or more RACH partitions, of the multiple RACH partitions, includes PRACH resources that are jointly configured for a combination of multiple RACH features.

Aspect 3: The method of any of Aspects 1-2, wherein, for each RACH partition, the RACH features in the respective combination of one or more RACH features associated with the RACH partition are compatible with one another.

Aspect 4: The method of any of Aspects 1-3, wherein the multiple RACH partitions that are configured include a subset of all possible combinations of one or more RACH features.

Aspect 5: The method of any of Aspects 1-4, wherein selecting the RACH partition includes: determining that the UE satisfies the one or more criteria for the combination of one or more RACH features associated with at least a first RACH partition and a second RACH partition, wherein the RACH partition is selected based at least in part on one or more rules that define relative priorities among different RACH features.

Aspect 6: The method of Aspect 5, wherein the one or more rules are specified in one or more wireless communication standards.

Aspect 7: The method of any of Aspect 5, wherein the one or more rules are configured in system information broadcasted by the base station.

Aspect 8: The method of any of Aspects 5-7, wherein the one or more rules define the relative priorities among the different RACH features according to a hierarchical tree in which each level corresponds to a particular RACH feature.

Aspect 9: The method of Aspect 8, wherein the hierarchical tree includes multiple paths, starting from a root of the hierarchical tree, that each correspond to a respective RACH partition, of the multiple RACH partitions.

Aspect 10: The method of any of Aspects 5-9, wherein the one or more rules define a prioritized order for a first RACH feature associated with uplink selection, a second RACH feature associated with a UE type, a third RACH feature associated with network slicing, a fourth RACH feature associated with a RACH procedure type, a fifth RACH feature associated with a coverage enhancement, a sixth RACH feature associated with an SDT, and a seventh RACH feature associated with preamble groupings.

Aspect 11: The method of Aspect 10, wherein the prioritized order includes a highest priority for the first RACH feature associated with uplink selection, a next highest priority for the second RACH feature associated with the UE type, a next highest priority for the third RACH feature associated with network slicing, a next highest priority for the fourth RACH feature associated with the RACH procedure type, a next highest priority for one or more of the fifth RACH feature associated with the coverage enhancement or the sixth RACH feature associated with the SDT, and a lowest priority for the seventh RACH feature associated with preamble groupings.

Aspect 12: The method of any of Aspects 1-11, wherein the multiple RACH partitions include at least one RACH partition associated with a dedicated PRACH configuration.

Aspect 13: The method of any of Aspects 1-12, wherein the multiple RACH partitions include at least a first RACH partition and a second RACH partition that share a PRACH configuration with non-overlapping RACH occasions or preambles split between the first RACH partition and the second RACH partition.

Aspect 14: The method of any of Aspects 1-13, wherein the multiple RACH partitions include at least a first RACH partition and a second RACH partition that share a PRACH configuration with a PRACH mask indicating a hierarchical configuration for RACH occasions or preambles associated with the PRACH configuration based at least in part on a relationship between a first combination of one or more RACH features associated with the first RACH partition and a second combination of one or more RACH features associated with the second RACH partition.

Aspect 15: The method of any of Aspects 1-14, wherein the preamble is transmitted using at least one RACH parameter having a value inherited from another RACH partition that has one or more RACH features in common with the RACH partition selected by the UE.

Aspect 16: The method of any of Aspects 1-15, further comprising: receiving information that indicates one or more on-demand RACH partitions that are supported by the base station without allocated PRACH resources; requesting, in an uplink message of the RACH procedure, an on-demand RACH partition, of the one or more on-demand RACH partitions supported by the base station, based at least in part on the UE satisfying one or more criteria for a combination of one or more RACH features associated with the on-demand RACH partition; receiving, in a downlink message of the RACH procedure, a PRACH configuration associated with the on-demand RACH partition; and transmitting, to the base station, a preamble on PRACH resources associated with the on-demand RACH partition to initiate a new RACH procedure supporting the combination of one or more RACH features associated with the on-demand RACH partition.

Aspect 17: A method of wireless communication performed by a base station, comprising: transmitting information that configures multiple RACH partitions, wherein the multiple RACH partitions are each associated with a respective combination of one or more RACH features; and receiving a preamble on PRACH resources associated with a RACH partition, from the multiple RACH partitions, wherein the preamble is received from a UE that satisfies one or more criteria for the combination of one or more RACH features associated with the RACH partition.

Aspect 18: The method of Aspect 17, wherein one or more RACH partitions, of the multiple RACH partitions, includes PRACH resources that are jointly configured for a combination of multiple RACH features.

Aspect 19: The method of any of Aspects 17-18, wherein, for each RACH partition, the RACH features in the respective combination of one or more RACH features associated with the RACH partition are compatible with one another.

Aspect 20: The method of any of Aspects 17-19, wherein the multiple RACH partitions that are configured include a subset of all possible combinations of one or more RACH features.

Aspect 21: The method of any of Aspects 17-20, wherein the RACH partition is selected based at least in part on one or more rules that define relative priorities among different RACH features.

Aspect 22: The method of Aspect 21, wherein the one or more rules are specified in one or more wireless communication standards.

Aspect 23: The method of Aspect 21, wherein the one or more rules are configured in system information broadcasted by the base station.

Aspect 24: The method of any of Aspects 21-23, wherein the one or more rules define the relative priorities among the different RACH features according to a hierarchical tree in which each level corresponds to a particular RACH feature.

Aspect 25: The method of Aspect 24, wherein the hierarchical tree includes multiple paths, starting from a root of the hierarchical tree, that each correspond to a respective RACH partition, of the multiple RACH partitions.

Aspect 26: The method of any of Aspects 21-25, wherein the one or more rules define a prioritized order for a first RACH feature associated with uplink selection, a second RACH feature associated with a UE type, a third RACH feature associated with network slicing, a fourth RACH feature associated with a RACH procedure type, a fifth RACH feature associated with a coverage enhancement, a sixth RACH feature associated with an SDT, and a seventh RACH feature associated with preamble groupings.

Aspect 27: The method of Aspect 26, wherein the prioritized order includes a highest priority for the first RACH feature associated with uplink selection, a next highest priority for the second RACH feature associated with the UE type, a next highest priority for the third RACH feature associated with network slicing, a next highest priority for the fourth RACH feature associated with the RACH procedure type, a next highest priority for one or more of the fifth RACH feature associated with the coverage enhancement or the sixth RACH feature associated with the SDT, and a lowest priority for the seventh RACH feature associated with preamble groupings.

Aspect 28: The method of any of Aspects 17-27, wherein the multiple RACH partitions include at least one RACH partition associated with a dedicated PRACH configuration.

Aspect 29: The method of any of Aspects 17-28, wherein the multiple RACH partitions include at least a first RACH partition and a second RACH partition that share a PRACH configuration with non-overlapping RACH occasions or preambles split between the first RACH partition and the second RACH partition.

Aspect 30: The method of any of Aspects 17-29, wherein the multiple RACH partitions include at least a first RACH partition and a second RACH partition that share a PRACH configuration with a PRACH mask indicating a hierarchical configuration for RACH occasions or preambles associated with the PRACH configuration based at least in part on a relationship between a first combination of one or more RACH features associated with the first RACH partition and a second combination of one or more RACH features associated with the second RACH partition.

Aspect 31: The method of any of Aspects 17-30, wherein the preamble is transmitted using at least one RACH parameter having a value inherited from another RACH partition that has one or more RACH features in common with the RACH partition selected by the UE.

Aspect 32: The method of any of Aspects 17-31, further comprising: transmitting information that indicates one or more on-demand RACH partitions that are supported by the base station without allocated PRACH resources; receiving, in an uplink message of the RACH procedure, a request for an on-demand RACH partition, of the one or more on-demand RACH partitions supported by the base station, based at least in part on the UE satisfying one or more criteria for a combination of one or more RACH features associated with the on-demand RACH partition; transmitting, in a downlink message of the RACH procedure, a PRACH configuration associated with the on-demand RACH partition; and receiving, from the UE, a preamble on PRACH resources associated with the on-demand RACH partition to initiate a new RACH procedure supporting the combination of one or more RACH features associated with the on-demand RACH partition.

Aspect 33: An apparatus for wireless communication at a device, comprising a processor; memory coupled with the processor; and instructions stored in the memory and executable by the processor to cause the apparatus to perform the method of one or more of Aspects 1-16.

Aspect 34: A device for wireless communication, comprising a memory and one or more processors coupled to the memory, the one or more processors configured to perform the method of one or more of Aspects 1-16.

Aspect 35: An apparatus for wireless communication, comprising at least one means for performing the method of one or more of Aspects 1-16.

Aspect 36: A non-transitory computer-readable medium storing code for wireless communication, the code comprising instructions executable by a processor to perform the method of one or more of Aspects 1-16.

Aspect 37: A non-transitory computer-readable medium storing a set of instructions for wireless communication, the set of instructions comprising one or more instructions that, when executed by one or more processors of a device, cause the device to perform the method of one or more of Aspects 1-16.

Aspect 38: An apparatus for wireless communication at a device, comprising a processor; memory coupled with the processor; and instructions stored in the memory and executable by the processor to cause the apparatus to perform the method of one or more of Aspects 17-32.

Aspect 39: A device for wireless communication, comprising a memory and one or more processors coupled to the memory, the one or more processors configured to perform the method of one or more of Aspects 17-32.

Aspect 40: An apparatus for wireless communication, comprising at least one means for performing the method of one or more of Aspects 17-32.

Aspect 41: A non-transitory computer-readable medium storing code for wireless communication, the code comprising instructions executable by a processor to perform the method of one or more of Aspects 17-32.

Aspect 42: A non-transitory computer-readable medium storing a set of instructions for wireless communication, the set of instructions comprising one or more instructions that, when executed by one or more processors of a device, cause the device to perform the method of one or more of Aspects 17-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
  receiving, from a base station, information that configures multiple random access channel (RACH) partitions, wherein the multiple RACH partitions are each associated with a respective combination of one or more RACH features;

determining, from among different RACH features, a RACH feature that has a highest priority;

determining, from among the different RACH features and based at least in part on more than one RACH partition being associated with the RACH feature having the highest priority, a second RACH feature that has a next highest priority;

selecting, if one or more criteria associated with both a first RACH partition and a second RACH partition are satisfied, the first RACH partition based at least in part on relative priorities among the different RACH features, wherein the multiple RACH partitions include the first RACH partition and the second RACH partition, and wherein selecting the first RACH partition is based at least in part on the RACH feature having the highest priority and the second RACH feature having the next highest priority; and transmitting, to the base station, a preamble on physical RACH (PRACH) resources associated with the first RACH partition to initiate a RACH procedure supporting the respective combination of one or more RACH features associated with the first RACH partition.

2. The method of claim 1, wherein the information hierarchically configures the multiple RACH partitions.

3. The method of claim 1, wherein:
one or more RACH partitions, of the multiple RACH partitions, includes PRACH resources that are jointly configured for a combination of multiple RACH features; or
for each RACH partition, the RACH features in the respective combination of one or more RACH features associated with the first RACH partition are compatible with one another.

4. The method of claim 1, wherein receiving the information that configures the multiple RACH partitions comprises receiving system information including the relative priorities among the different RACH features.

5. The method of claim 4, wherein the relative priorities among the different RACH features are defined according to a hierarchy.

6. The method of claim 4, wherein the relative priorities define a prioritized order for one or more of:
a first RACH feature associated with reduced capability,
a fifth RACH feature associated with network slicing,
a third RACH feature associated with coverage enhancement, or
a fourth RACH feature associated with small data transfer.

7. The method of claim 1, wherein the multiple RACH partitions include at least one RACH partition associated with a dedicated PRACH configuration.

8. The method of claim 1, wherein selecting the first RACH partition is based at least in part on the relative priorities among the different RACH features that are associated with the first RACH partition, the second RACH partition, or both the first RACH partition and the second RACH partition.

9. A first apparatus for wireless communication, comprising:
a memory; and
one or more processors coupled to the memory, wherein the first apparatus is configured to:
receive, from a second apparatus, information that configures multiple random access channel (RACH) partitions, wherein the multiple RACH partitions are each associated with a respective combination of one or more RACH features;

determine, from among different RACH features, a RACH feature that has a highest priority;

determine, from among the different RACH features and based at least in part on more than one RACH partition being associated with the RACH feature having the highest priority, a second RACH feature that has a next highest priority;

select, if one or more criteria associated with both a first RACH partition and a second RACH partition are satisfied, the first RACH partition based at least in part on relative priorities among the different RACH features, wherein the multiple RACH partitions include the first RACH partition and the second RACH partition, and wherein, to select the first RACH partition, the first apparatus is configured to select the first RACH partition based at least in part on the RACH feature having the highest priority and the second RACH feature having the next highest priority; and transmit, to the second apparatus, a preamble on physical RACH (PRACH) resources associated with the first RACH partition to initiate a RACH procedure supporting the respective combination of one or more RACH features associated with the first RACH partition.

10. The first apparatus of claim 9, wherein the information hierarchically configures the multiple RACH partitions.

11. The first apparatus of claim 9, wherein:
one or more RACH partitions, of the multiple RACH partitions, includes PRACH resources that are jointly configured for a combination of multiple RACH features; or
for each RACH partition, the RACH features in the respective combination of one or more RACH features associated with the first RACH partition are compatible with one another.

12. The first apparatus of claim 9, wherein, to receive the information that configures the multiple RACH partitions, the first apparatus is configured to receive, from the second apparatus, system information including the relative priorities among the different RACH features.

13. The first apparatus of claim 12, wherein the relative priorities among the different RACH features are defined according to a hierarchy.

14. The first apparatus of claim 12, wherein the relative priorities define a prioritized order for one or more of:
a first RACH feature associated with reduced capability,
a fifth RACH feature associated with network slicing,
a third RACH feature associated with coverage enhancement, or
a fourth RACH feature associated with small data transfer.

15. The first apparatus of claim 9, wherein the multiple RACH partitions include at least one RACH partition associated with a dedicated PRACH configuration.

16. The first apparatus of claim 9, wherein the multiple RACH partitions include at least two RACH partitions that share a PRACH configuration with non-overlapping RACH occasions or preambles split between the at least two RACH partitions.

17. The first apparatus of claim 9, wherein the first apparatus is configured to:
receive information that indicates one or more on-demand RACH partitions that are supported by the second apparatus without allocated PRACH resources;
request, in an uplink message of the RACH procedure, an on-demand RACH partition, of the one or more on-demand RACH partitions supported by the second apparatus, based at least in part on the first apparatus satisfying one or more criteria for a combination of one or more RACH features associated with the on-demand RACH partition;

receive, in a downlink message of the RACH procedure, a PRACH configuration associated with the on-demand RACH partition; and transmit, to the second apparatus, a preamble on PRACH resources associated with the on-demand RACH partition to initiate a new RACH procedure supporting the combination of one or more RACH features associated with the on-demand RACH partition.

18. The first apparatus of claim 9, wherein, to select the first RACH partition, the first apparatus is configured to select the first RACH partition based at least in part on the relative priorities among the different RACH features that are associated with the first RACH partition, the second RACH partition, or both the first RACH partition and the second RACH partition.

* * * * *